(12) United States Patent
Al-Kaabi et al.

(10) Patent No.: US 7,234,904 B2
(45) Date of Patent: Jun. 26, 2007

(54) COIL STOP FOR RAIL ROAD COIL CAR

(75) Inventors: Mohammed Al-Kaabi, Hamilton (CA); Ilario A. Coslovi, Burlington (CA)

(73) Assignee: National Steel Car Limited (CA)

( * ) Notice: Subject to any disclaimer, the term of this patent is extended or adjusted under 35 U.S.C. 154(b) by 0 days.

(21) Appl. No.: 11/184,686

(22) Filed: Jul. 19, 2005

(65) Prior Publication Data

US 2005/0254916 A1 Nov. 17, 2005

Related U.S. Application Data

(62) Division of application No. 10/386,991, filed on Mar. 12, 2003, now Pat. No. 6,923,607, which is a division of application No. 09/738,128, filed on Dec. 15, 2000, now Pat. No. 6,579,048.

(51) Int. Cl.
*B60P 7/15* (2006.01)

(52) U.S. Cl. .......................... 410/49; 410/47; 410/143; 410/150

(58) Field of Classification Search ................. 410/30, 410/47, 49, 50, 143, 144, 150; 105/355, 105/401; 248/351; 188/32
See application file for complete search history.

(56) References Cited

U.S. PATENT DOCUMENTS 2,468,101 A 4/1949 Nampa (Continued)

FOREIGN PATENT DOCUMENTS

| DE | 3637127 | 8/1987 |
|---|---|---|
| GB | 2052416 | 12/1981 |

OTHER PUBLICATIONS

Car and Locomotive Cyclopedia, 1984 ed., Simmons-Boardman Publishing Corporation, New York, NY, p. 95 and 137.

(Continued)

*Primary Examiner*—Stephen Gordon
(74) *Attorney, Agent, or Firm*—Hahn Loeser & Parks LLP; Michael H. Minns

(57) ABSTRACT

A coil car has a pair of deep side sills and a trough structure mounted to, and suspended between, the deep side sills for carrying coils. The side sills extend between the rail car trucks and act as a pair of deep side beams for carrying vertical loads. The deep side sills are arranged to extend above and below the center sill of the coil car to give vertical stiffness to the coil car. The top chord members of the side sills are outwardly splayed relative to the bottom chord members of the side sills. Cross-bearers extend outwardly and away from the center sill to attach to the side sills. The trough structure has three parallel, longitudinally extending troughs—a central trough lying between two laterally outboard outer troughs. Each trough is shaped to cradle steel coils, or other similar loads, between its inwardly and downwardly sloping shoulder plates. The shoulder plates are lined with cushioning to buffer coils during loading or travel. The outboard troughs are mounted above longitudinally extending stringers and are carried at a greater height relative to top of rail than the central trough. The car has coil stops to discourage longitudinal shifting of loaded coils. The coil stops have rollers to facilitate repositioning during loading, and a mid-span step and hand grabs to facilitate climbing over the coil stop by personnel walking along the trough structure.

15 Claims, 16 Drawing Sheets

U.S. PATENT DOCUMENTS

| | | |
|---|---|---|
| 2,494,404 A | 1/1950 | Nixon |
| 2,894,462 A | 7/1959 | Newcomer et al. |
| 2,958,492 A | 11/1960 | Maynard |
| 2,971,795 A | 2/1961 | Winski |
| 2,977,900 A | 4/1961 | Farrar |
| 2,991,734 A | 7/1961 | Gabriel |
| 3,009,426 A | 11/1961 | Nampa |
| 3,061,255 A | 10/1962 | Gallo et al. |
| 3,186,357 A | 6/1965 | Fillion |
| 3,223,259 A | 12/1965 | Nicholson |
| 3,291,072 A | 12/1966 | Cunningham |
| 3,291,073 A | 12/1966 | James |
| 3,307,495 A | 3/1967 | Chapman et al. |
| 3,307,497 A | 3/1967 | Chapman et al. |
| 3,353,506 A | 11/1967 | Snyder et al. |
| 3,376,062 A | 4/1968 | Chosy et al. |
| 3,392,682 A | 7/1968 | Francis |
| 3,413,931 A | 12/1968 | Augustine |
| 3,430,981 A | 3/1969 | Tarantola |
| 3,465,692 A | 9/1969 | Hyatt |
| 3,493,210 A | 2/1970 | Brenner |
| 3,508,503 A | 4/1970 | Daly |
| 3,581,674 A | 6/1971 | O'Leary |
| 3,605,638 A | 9/1971 | James |
| 3,628,466 A | 12/1971 | Lyons et al. |
| 3,658,011 A | 4/1972 | West et al. |
| 3,658,195 A | 4/1972 | Fantin |
| 3,875,617 A | 4/1975 | Cline |
| 3,912,325 A | 10/1975 | Sudyk |
| 3,922,004 A | 11/1975 | Chamberlain |
| 4,102,274 A | 7/1978 | Feary et al. |
| 4,204,479 A | 5/1980 | Rosa |
| 4,240,773 A | 12/1980 | Terry |
| 4,315,707 A | 2/1982 | Fernbach |
| 4,357,048 A | 11/1982 | Zehnder et al. |
| 4,367,059 A | 1/1983 | Stubbins |
| 4,451,188 A | 5/1984 | Smith et al. |
| 4,526,500 A | 7/1985 | Patrick |
| 4,580,843 A | 4/1986 | Lund |
| 4,686,907 A | 8/1987 | Woollam et al. |
| 4,702,653 A | 10/1987 | Gaulding et al. |
| 4,732,528 A | 3/1988 | Good |
| 4,754,709 A | 7/1988 | Gramse et al. |
| 4,782,762 A | 11/1988 | Johnstone et al. |
| 4,805,539 A | 2/1989 | Ferris et al. |
| 4,841,876 A | 6/1989 | Gramse et al. |
| 5,048,885 A | 9/1991 | Bomar |
| 5,085,152 A | 2/1992 | Tylisz et al. |
| 5,170,717 A | 12/1992 | Richmond et al. |
| 5,191,842 A | 3/1993 | Tinkler |
| 5,211,518 A | 5/1993 | Mimica |
| 5,228,823 A | 7/1993 | Crook |
| 5,329,858 A | 7/1994 | Morris et al. |
| 5,336,027 A | 8/1994 | Paddock |
| 5,341,747 A | 8/1994 | Fetternam et al. |
| 5,343,812 A | 9/1994 | Ishida |
| 5,343,813 A | 9/1994 | Septer |
| 5,373,792 A | 12/1994 | Pileggi et al. |
| 5,401,129 A | 3/1995 | Eatinger |
| 5,425,608 A | 6/1995 | Reitnouer |
| 5,476,348 A | 12/1995 | Shelleby |
| 5,520,489 A | 5/1996 | Butcher et al. |
| 5,538,376 A | 7/1996 | Borda |
| 5,562,046 A | 10/1996 | Fetterman et al. |
| 5,564,341 A | 10/1996 | Martin |
| 5,622,116 A | 4/1997 | Carlton |
| 5,765,485 A | 6/1998 | Thoman et al. |
| 5,954,465 A | 9/1999 | Ellerbush |
| 6,077,005 A | 6/2000 | Westlake |
| 6,190,100 B1 | 2/2001 | Mawji |
| 6,579,048 B2 | 6/2003 | Al-Kaabi et al. |
| 6,923,607 B2 * | 8/2005 | Al-Kaabi et al. ............ 410/49 |

OTHER PUBLICATIONS

Car and Locomotive Cyclopedia, 1966 ed., Simmons-Boardman Publishing Corporation, New York, NY, pp. 151, 285 to 289.
Car and Locomotive Cyclopedia, 1974 ed., Simmons-Boardman Publishing Corporation, New York, NY, pp. S3-59 to S3-63.
Car and Locomotive Cyclopedia, 1980 ed., Simmons-Boardman Publishing Corporation, New York, NY, pp. 148, 150, 151 and 154.
Car and Locomotive Cyclopedia, 1997 ed., Simmons-Boardman Publishing Corporation, New York, NY, p. 79-81 and 90.
Promotional material Zeftek® Inc., Montgomery, Illinois, date of publication unknown.
Promotional material, Thrall Car, Chicago Heights, Illinois, date of publication unknown.
Promotional material and photographs, Norfolk Southern, showing a coil car bearing model No. NS 167210, date of publication unknown.
Photographs of various coil cars, taken on Jan. 15, 1997.
Photograph of coil car, taken on Nov. 6, 1995.
Photograph of coil car, taken on Feb. 6, 1996.

* cited by examiner

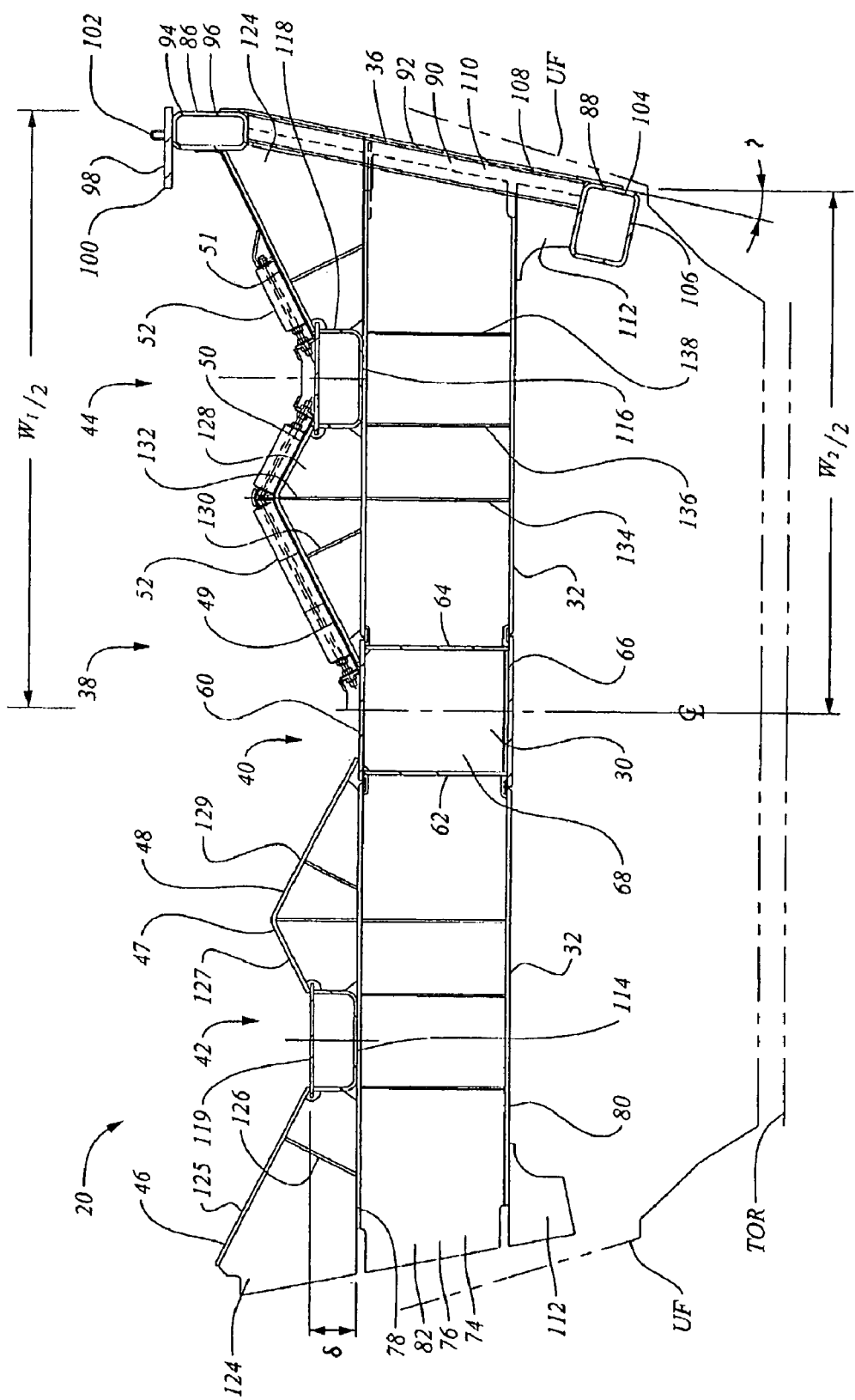

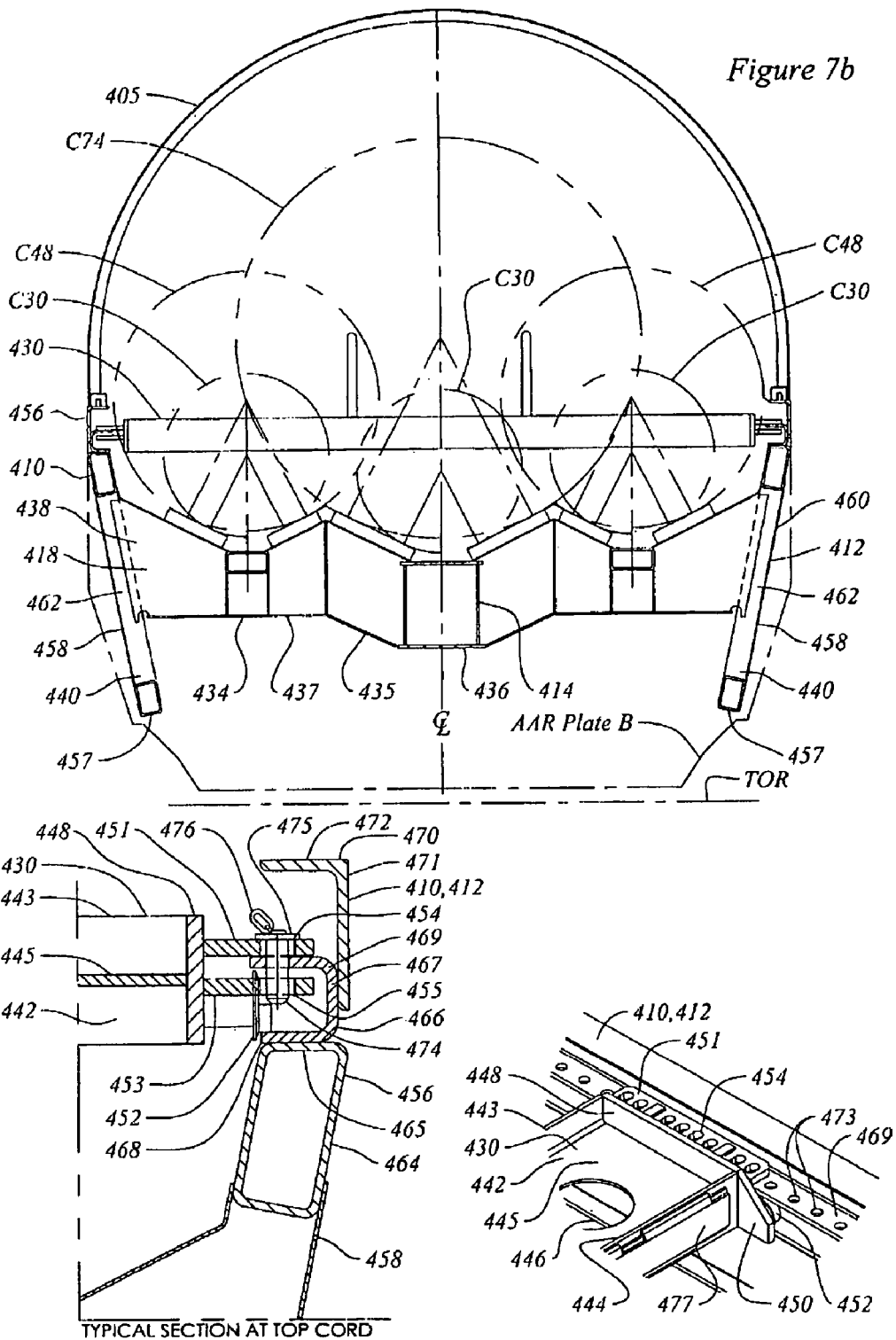

COIL STOP FOR RAIL ROAD COIL CAR

This application is a divisional of U.S. patent application Ser. No. 10/386,991 filed Mar. 12, 2003, now U.S. Pat. No. 6,923,607, which is a divisional of U.S. patent application Ser. No. 09/738,128 filed Dec. 15, 2000, now U.S. Pat. No. 6,579,048, which applications are hereby incorporated by reference herein.

FIELD OF INVENTION

This invention relates to the field of railroad cars having multiple troughs for transporting heavy cylindrical objects such as, for example, coils of rolled sheet metal.

BACKGROUND OF THE INVENTION

Railroad coil cars are used to transport coiled materials, most typically coils of steel sheet. Coils can be carried with their coiling axes of rotation (that is, the axes of rotation about which the coils are wound) oriented longitudinally, that is, parallel to the rolling direction of the car. The coils are generally carried in a trough, or troughs, mounted on a railcar underframe. The troughs are generally V-shaped and have inwardly inclined surfaces that support the coil. The troughs are typically lined with wood decking to provide cushioning for the coils. When a coil sits in a trough, the circumference of the coil is tangent to the V at two points such that the coil is prevented from rolling.

A coil car may have single, double or triple longitudinally extending troughs. The use of multiple troughs allows any single car to carry either a load of large coils in the center trough or a load of relatively smaller diameter coils, or coils of various diameters such that lading more closely approaches maximum car capacity during a higher percentage of car operation. Additionally, some coil cars have been provided with trough assemblies that can be shifted to permit conversion between different trough modes. An example of a coil car that can be converted from a single to a double trough mode can be found in U.S. Pat. No. 3,291,072, issued to Cunningham on Dec. 13, 1966. Similarly, conversion of a coil car from a single or triple trough arrangement to a double trough mode is shown in U.S. Pat. No. 4,451,188, issued to Smith et al., on May 29, 1984. The general object is to provide versatility such that overall car utilisation is improved. Hence, the car is more economically attractive to a user.

Historically, coil cars have been constructed on a flat car underframe having a through-center-sill, that is, a main center sill that runs from one end of the rail car to the other. In this type of car the center sill serves as the main structural member of the car and functions as the primary load path of the car both for longitudinal buff and draft loads from coupler to coupler, and for carrying the vertical load bending moment between the trucks. The trough structure, or bunk, is mounted on the flat car deck. In such a car the cross-bearers carry loads into the main center sill. The side sills tend to be relatively small, and serve to tie the outboard ends of the cross-bearers together. Conventionally, the center sill is box-shaped in cross-section. That is, it is rectangular and has a constant depth of section. The top and bottom flanges of the main center sill tend to be very heavy in such cars, since they are relied upon to carry the vertical bending load.

Alternatively, another way to construct a coil car having a triple trough arrangement employs a central trough supported by a main center sill and an array of laterally extending cross-bearers and cross-ties that are angled upward and outward in a V-shape. At their distal end the cross-bearers and cross-ties meet, and are tied together by, relatively small side sills in a manner generally similar to a flat car. A central trough extends longitudinally above the center sill with side troughs lying outboard of the central trough. The side troughs are formed using slanted decking and are mounted above the cross-bearers at about the same height as the central trough relative to top of rail. In this arrangement the center sill is still relied upon to carry the great majority of the bending load.

Coil cars can also be fabricated as integrated structures. One way to do this is to employ a deep center sill, elevated side sills, and substantial cross-bearers mounted in a V between the center sill and substantial, load bearing side sills. The cross bearers and trough sheets carry shear between the side sills and the center sill. In this way the structural skeleton of the car acts in the manner of a deep V-shaped channel with flanges at each toe, namely the side sills, and at the point of the V, namely the center sill. In this arrangement, under vertical bending loads, the side sills are in compression, and the main sill is in tension.

In the cases of either a V-shaped integrated structure, or even a traditional flat car based structure, it may be beneficial to employ a "fish belly" center sill. A fish belly center sill is a center sill that is relatively shallow over the trucks, and has a much deeper central portions in the longitudinal span between the trucks. It is advantageous to have a deeper section at mid-span where the bending moment due to vertical loads may tend to be greatest.

Another way to achieve a greater depth of effective section in an integrated structure, so that a higher sectional second moment of area is obtained, is to employ deep side sills, in a manner akin to a well car. The deep side sills act as longitudinal beams. A longitudinal cradle, namely the trough structure, is hung between the side sills. In this kind of car, the main longitudinal structural members are the side sills which carry the great majority of the bending load. The cradle itself may have a center sill to tie the cross-bearers together at mid-span between the side sills. A center sill of modest proportions is sufficient for this purpose. The side sills carry the load back to main bolsters, and then into the draft gear mounted longitudinally outboard of each truck.

Where deep side sills are used, the minimum height of the bottom chord of the side sill is determined by the underframe portion of the design envelope prescribed by the AAR, such as for AAR plate B, plate C, or such other plate as may be applicable. At lower heights, the allowable width of the car diminishes, so the overall width of the car measured over the side sill bottom chords needs to be relatively narrow as sectional depth increases. Conversely, to accommodate the largest possible load width, it may tend to be desirable for the top chords of the side sills to be spread as far as possible within the allowable car width of 10'–8". Thus it may be beneficial to locate the bottom chord closer to the car centerline than the top chord.

It may be desirable to be able to carry steel coils in a side-by-side arrangement. If three troughs are provided, it is advantageous for the center trough to be carried at a different height, relative to top of rail (TOR), than the outboard, or side, troughs. This may be beneficial for at least several reasons.

First, the total width of lading that can be carried by a coil car at one time is limited by the allowable car width envelope. If three identically sized coils are mounted such that the axes of the coils are carried at the same height relative to top of rail, then the sum of the diameters of the coils, plus the necessary clearance between coils, is limited by the maximum allowable coil car lading width. However, if the coiling axis of rotation of one coil is higher than an adjacent coil of equal or lesser diameter, then it may be possible to carry the coils in a partially encroaching, or overlapping, arrangement. That is, a greater sum of diameters may be accommodated than would otherwise be possible within the nominal maximum loading width. As a result, lading can include a combination of larger coils than might otherwise be possible, thus tending to improve car capacity utilisation.

Second, it is desirable that the point of maximum width of the load be carried at a height that is greater than the height of the uppermost extremity of the top chord members of the side sills. Once again, the advantage of this is that, generally, this will allow the vertical projection of the outboard coil to encroach more closely to the inner edge of the top chord, and so permit a larger coil to be carried in the outboard trough. This condition may be reached when the car is carrying two coils in excess of 40 inches in diameter side by side, with the central trough either empty, or carrying a relatively small coil, such as a coil of rather less than 30 inches in diameter. Since the second moment of area of the primary load bearing structure varies strongly with the depth of section, it is better for the side sill top chord to be carried at a relatively high level. Since the height of the top chord is related to the height of the outboard trough, an increase in elevation of the outboard trough by even a few inches is advantageous.

Third, in terms of car versatility, it is advantageous to be able to carry a variety of loads, whether a single very large coil in the central trough, two medium sized coils side-by-side in the outside troughs, or three somewhat smaller coils in each of three troughs. In general, the larger the central trough, the smaller the outboard troughs. If the outboard troughs are raised relative to the central trough, the overall trough capacity, and hence car versatility, will be increased. That is, a car with a central trough capable of accommodating a 74 inch coil, may only be able to accommodate 36 inch coils in the outboard troughs when the central trough is empty if the troughs are all carried at the same height. However, if the outboard troughs are carried at a higher level, then it may be possible to carry outboard coils of greater diameter, such as 44 or 48 inches, when the central trough is empty.

Reference is made herein to troughs being carried at the same, or different, heights relative to top of rail, commonly on an assumption of troughs of generally similar geometry. For the purposes of this description, each of the troughs has planar sloped side sheets. The planes of the opposed side sheets meet at some line of intersection parallel to the longitudinal center line of the car, the line of intersection lying at some height below the flat bottom of the valley of the trough. In structural terms, the difference in the height at which one trough is carried relative to another trough can be taken by comparison of the heights of the flat bottoms of the valley, since the bottom height may tend to be defined by the upper flange of a longitudinally extending structural member.

Reference can also be made to the height at which the centerlines of coils of the same size would lie for the various troughs. This is not a function of the height of the bottom of the valley, but rather of the height of the line of intersection of the planes of the slope sheets (assuming them to be planar), and the angle of the slope sheets. Once the angle of slope has been chosen, the difference in height of the flat bottom of the valley relative to the line of intersection of the planes is determined by the minimum diameter of coil to be carried, which will, with allowance for clearance, fix the width of the flat bottom. For troughs having the same angle of slope and the same bottom height, a narrow bottom will force a coil to be carried relatively higher than a wide bottom. Similarly, for bottoms of the same height and width, a steep slope will force a coil to be carried higher than a shallow slope.

The slope of the trough is an important design parameter. Whether for single or multiple trough cars, it is generally desirable that a coil not be able to escape from the trough during cornering. One standard is that a coil should not escape under a 0.45 g lateral load as a condition for general interchange service. This implies a trough slope of about 24.2 degrees measured from the horizontal. At least one rail road company has indicated that a slope of 23 degrees is acceptable for its purposes. It is also desirable for the troughs to have some allowance for lateral tilting or swaying of the cars during lateral loading, such as 2 or 3 degrees. This implies a desirable trough angle of about 27 degrees, (namely, 24 plus 3). Trough width is a function of the chord length between the points of tangency of the largest coil to be carried to the opposed trough sheets. Consequently, as the trough slope angle decreases, the trough width decreases. Similarly, as slope angle increases, the trough becomes wider. However, as noted above, the sum of the widths of the troughs is limited by the plate B envelope, less the widths of the side sills and a clearance dimension between the side sills and the coils, and between adjacent coils.

For trough width maximisation, it is advantageous for the side sills to be carried close to the design envelope lateral boundaries. For interchangeable service, the lateral boundaries are defined by AAR plate B, with a width of 128 inches. In the past, coil cars have carried walkways outboard of the side sills of the trough cradles. It is advantageous not to have walkways that would extend beyond the plate B limit. One inventor has suggested using folding walkways that can be moved to a retracted position within the side sills. It would be advantageous to employ fixed walkways that do not require moving mechanisms.

Another rail road requirement has been for a restraining device, called a coil stop, to prevent longitudinal displacement of the coils during operation. Typically, a coil stop is a transversely oriented beam, or movable bulkhead, located in position across the trough after a coil has been loaded. The coil stop extends between the side sills and can be moved to a location near to a seated coil. The coil stop is then releasably, or removably anchored, typically with pins that locate in perforated strips mounted to the side sills. Shims are then inserted between the coil stop and the coil to give a snug fit. One design criterion suggests that the restraining device bear upon the coil at a height that is at least as high as the horizontal chord that subtends an arc of 108 degrees of the largest coil the trough is capable of carrying.

It is possible to use a coil stop bar retaining strip that extending laterally inboard of the side sill. However, it is generally desirable to trim the coil stop engagement strip back to increase the capacity of the outboard troughs. To this end, alternative embodiments of coil stop are described. In one embodiment, a horizontal pin is used to engage a strip mounted to a side web of the top chord of the side sill. In another embodiment vertical pins of the coil stop engage perforations in a horizontal strip placed within the vertical profile of the top chord.

Since coil stops are relatively heavy, it would be advantageous to provide a coil stop that is designed to be moved more easily from place to place along the troughs of the car. It would be advantageous to employ rollers, or a slider, for this purpose. Ease of adjustment can also be enhanced by reducing the weight of the coil stop, such as by removing material from the horizontal coil stop web.

When outboard troughs are used, as in a triple trough arrangement, it is advantageous for a longitudinal stringer to tie adjacent cross-bearers together along the spine, or groin, of the outboard troughs. Where the cross-bearer has a web and an upper flange defining the slope of the trough sheets, the stringer, such as a hollow section, can be located in a relief formed in the cross-bearer web. The bottom of the trough so formed may also provide a walkway space. When the bottom of the trough is used as a walkway, it may be advantageous for the coil stop to be provided with climbing means, such as a step, or stile, and handgrabs.

SUMMARY OF THE INVENTION

In an aspect of the invention there is a railroad coil car having a length and a width. The coil car has a pair of first and second end structures each mountable upon a rail car truck. The coil car has a pair of side sills extending between the end structures. There is a trough structure for carrying coils mounted between the side sills. Each of the side sills has a top chord, a bottom chord and intermediate structure joining the top and bottom chords. The coil car has a greater width measured across the top chords of the side sills than across the bottom chords of the side sills.

In another aspect of the invention, there is a railroad coil car having a length and a width. The coil car has a pair of first and second end structures each mounted upon a rail car truck. A pair of side sills extend between the end structures. A trough structure is mounted between the side sills. The trough structure includes at least two longitudinally extending parallel troughs. The side sills each have first and second end portions and a medial portion located between the first and second end portions. The medial portion has a greater depth of section than the end portions.

In another aspect of the invention, there is a coil car having a walkway mounted within the trough structure to facilitate movement of personnel along the car, whether for adjusting the coil stops or for cleaning and maintaining the car. That is to say, in that aspect of the invention there is a rail road coil car. It has a trough structure supported for carriage by rail car trucks for travel in a longitudinal rolling direction. The trough structure has a walkway mounted therewithin.

In a further feature of that aspect of the invention, the trough structure includes a first trough. The first trough is longitudinally oriented, and the walkway is oriented longitudinally within the first trough. In another feature, the first trough has a pair of first and second slope sheets defining opposed flanks of the first trough. The first trough has a valley bottom between the flanks, and the walkway extending along the valley bottom. In an additional feature, tread plates are mounted along the walkway. In another feature, the rail road coil car has a longitudinal structural member defining the valley bottom. In still another feature, the longitudinal structural member is a longitudinal center sill.

In a further feature, the rail road coil car includes a center sill and cross bearers extending laterally from the center sill. The cross-bearers support the trough structure. The longitudinal structural member is a stringer mounted to the cross bearers. The longitudinal stringer lies laterally outboard to one side of the center sill. In another feature, the stringer is a first stringer, and the rail road car includes a second trough parallel to the first trough. The second trough has a second valley bottom lying over a second longitudinal stringer mounted to the cross bearers along the second valley bottom.

In another additional feature the first and second stringers are located symmetrically to either side of the center sill. In still another feature, a third trough is mounted over the center sill parallel to the first and second troughs.

In a further feature, the trough structure includes a second trough extending parallel to the first trough, the second trough having third and fourth slope sheets defining opposed flanks of the second trough, the second trough having a valley bottom between the flanks thereof, and the second trough having a second walkway extending along the valley bottom thereof. In another feature, the rail road car has first and second side sills bounding the trough structure, and the walkway is located within the trough structure at a location between the side sills.

In another feature, the rail road coil car has structure defining a cover interface to which a coil car cover can be mounted, the interface defining a boundary to a region of the coil car sheltered when a cover is mounted to the cover interface, and the walkway lies within the boundary. In an additional feature, the rail road coil car includes a rail car body, the trough structure is part of the rail car body, and the rail road coil car includes a cover for sheltering coils carried in the trough structure, the cover being movable to permit loading of the coil car, the cover having a footprint mating with the rail car body, and the walkway falls within the footprint of the cover. In that additional feature, the rail car body includes first and second side sills extending longitudinally along opposite sides of the trough structure, and the cover seats on the side sills. In a further additional feature, the side sills each have a top chord, and the cover seats on the top chords of the side sills.

In another feature, the coil car has at least one movable coil stop mounted thereto, the coil stop being co-operable with the trough structure to accommodate coils of different thickness in the trough structure. In an additional feature, the walkway provides access to the coil stop. In another additional feature, the coil stop is mounted transversely relative to the walkway.

In a further additional feature of the invention, the coil car falls within a design envelope width limit of 128 inches. The trough structure includes first, second and third troughs, the first second and third troughs being parallel and extending in the longitudinal direction. First and second side sills extend longitudinally along opposite sides of the trough structure. The side sills include respective first and second top chord members. At least a portion of each of the respective first and second top chord members lies within 2 inches of the design envelope width limit.

In another aspect of the invention, there is a coil stop for a rail road coil car. The coil car has a trough structure in which to carry coils. The coil stop has a beam member for spanning the trough structure. The beam member has a first end, a second end, and a medial portion extending between the first and second ends. The coil stop has a step mounted on the beam member between the first and second ends to facilitate climbing over the coil stop.

In an additional feature of that aspect of the invention, the step includes a tread plate mounted upon the beam. In another feature, the step is mounted centrally on the beam. In a further feature, a hand grab is mounted to the beam adjacent to the step. In an alternative feature, a pair of first and second hand grabs is mounted to either side of the step.

In still another additional feature, the beam includes a horizontal web, and the step is mounted to the horizontal web. In an additional feature, the horizontal web has lightening holes defined therein. In another feature, at least one of the first and second ends has an indexing member mounted thereto for engagement with the coil car. In still another feature the coil stop includes rollers mounted at the first and second ends therefor for facilitating positioning of the coil stop in the trough structure of the rail car.

In another aspect of the invention there is a coil stop for a rail road coil car. The coil car has a trough structure in which to carry coils. The coil stop includes a beam member for spanning the trough structure. The beam member has a first end, a second end, and a medial portion extending between the first and second ends. The coil stop has rollers mounted at the first and second ends to facilitate positioning of the coil stop relative to the trough structure. In a further feature, the coil stop has indexing members mounted at the first and second ends of the beam member. The indexing members are engageable to maintain the coil stop in a fixed position relative to the trough structure. In an additional feature, the coil stop has attachment means mounted at the first and second ends of the beam by which to secure the coil stop in a fixed position relative to the trough structure.

In a further aspect of the invention, there is a rail road coil car having a rail car body supported by rail car trucks for rolling motion in a longitudinal direction. The rail car body including a trough structure for carrying coils, and at least one coil stop for restraining coils loaded in the trough structure. The coil stop is movable along the trough structure. A trackway is mounted to the body for guiding the coil stop along the trough structure. The coil stop has fittings engaged with the trackway. The fittings and the trackway are co-operable to permit motion of the coil stop along the trough structure.

In an additional feature of that aspect of the invention, the trough structure includes a first longitudinally oriented trough. The rail car body includes first and second side sills extending along the trough structure, and the trackway is mounted to the side sills. In a further additional feature, the trackway includes a first portion mounted to the first side sill and a second portion mounted to the second side sill, and the coil stop has a beam member spanning the trough. The beam member has a first end mounted to the first side sill and a second end mounted to the second side sill.

In another additional feature, the coil stop includes a beam member for spanning the trough structure. The beam member has a first end, a second end, and a medial portion extending between the first and second ends. The coil stop has a step mounted on the beam member between the first and second ends, whereby persons walking along the trough structure can more easily climb over the coil stop.

In an additional feature of that additional feature, the step includes a tread plate mounted upon the beam. The step is mounted centrally on the beam, and a hand grab is mounted to the beam adjacent to the step. Alternatively, a pair of first and second hand grabs is mounted to either side of the step. In an additional feature, the hand grab is an upwardly extending hand rung.

In another feature, the coil stop includes a beam member for spanning the trough structure, the beam member having a first end, a second end, and a medial portion extending between the first and second ends. The body has at least a first indexing fitting mounted thereto. At least one of the first and second ends has a second indexing member mounted thereto. The second indexing member is co-operable with the first indexing member to maintain the coil stop in a fixed position relative to the trough structure. In still another feature, the coil stop includes rollers mounted at the first and second ends therefor for facilitating positioning of the coil stop in the trough structure of the rail car.

In another aspect of the invention, there is a coil stop for a coil car having a trough structure in which to carry coils. The coil stop includes a beam member for spanning the trough structure. The beam member has a first end, a second end, and a medial portion extending between the first and second ends. The coil stop has a hand grab mounted on the beam member between the first and second ends, whereby to facilitate climbing over the coil stop by persons walking along the trough structure.

BRIEF DESCRIPTION OF THE DRAWINGS

For a better understanding of the present invention and to show more clearly how it may be carried into effect, reference will now be made to the exemplary embodiments illustrated in the accompanying drawings, which show the apparatus according to the present invention and in which:

FIG. 2 is a side view of half of the coil car of FIG. 1a;

FIG. 3a is a cross-sectional view of the coil car of FIG. 1a at mid-span with the one side sill and one set of deck cushions removed;

FIG. 3b is a staggered sectional view taken on '3b—3b' of the coil car of FIG. 1a;

FIG. 4 is a top view of an alternate triple trough coil car to the coil car of FIG. 1a;

FIG. 6c shows a still further alternate cross-section to that of FIG. 5a;

FIG. 7b shows a mid-span cross-sectional view of the coil car of FIG. 7a;

FIG. 7c shows an enlarged cross-sectional detail of a top chord of a side sill of the coil car of FIG. 7a;

FIG. 7d shows an isometric detail of the engagement of the coil stop beam with the top chord of the coil car of FIG. 7a;

FIG. 8a shows a partial side view of an alternate coil car to the coil car of FIG. 1a;

FIG. 8b shows a mid span cross-section of the coil car of FIG. 8a;

FIG. 8c shows a staggered cross-section of the coil car of FIG. 8b taken on a section corresponding to staggered section '3b—3b' of the coil car of FIG. 1a.

DETAILED DESCRIPTION OF THE INVENTION

Figure 1A:
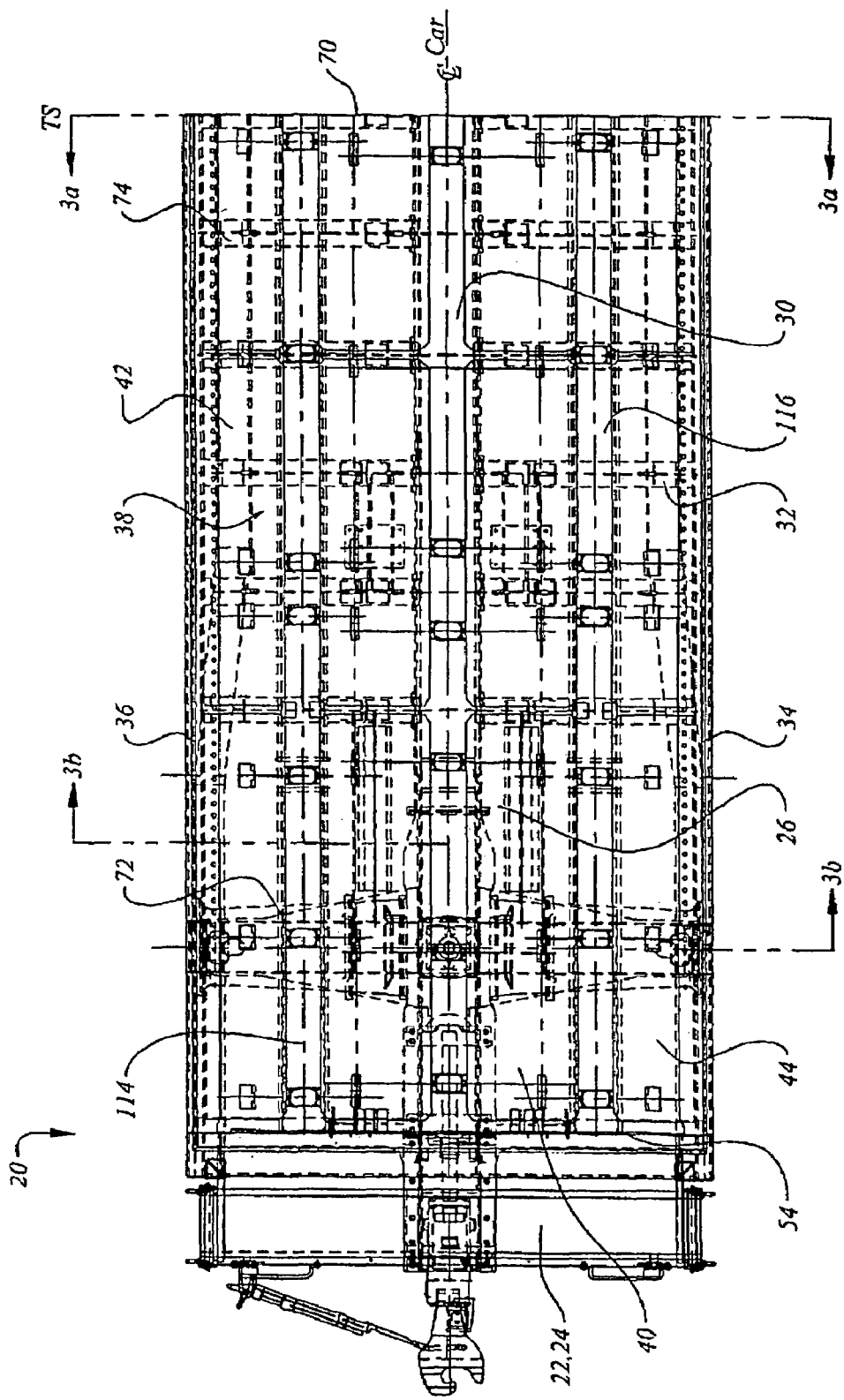
FIG. 1a is a top view of one half of a coil car according to the present invention.

The description that follows, and the embodiments described therein, are provided by way of illustration of an example, or examples of particular embodiments of the principles of the present invention. These examples are provided for the purposes of explanation, and not of limitation, of those principles and of the invention. In the description that follows, like parts are marked throughout the specification and the drawings with the same respective reference numerals. The drawings are not necessarily to scale and in some instances proportions may have been exaggerated in order more clearly to depict certain features of the invention.

In terms of general orientation and directional nomenclature, for each of the rail road cars described herein, the longitudinal direction is defined as being coincident with the rolling direction of the car, or car unit, when located on tangent (that is, straight) track. In the case of a car having a center sill, whether a through center sill or stub sill, the longitudinal direction is parallel to the center sill, and parallel to the side sills, if any. Unless otherwise noted, vertical, or upward and downward, are terms that use top of rail TOR as a datum. The term lateral, or laterally outboard, refers to a distance or orientation relative to the longitudinal centerline of the railroad car, or car unit, indicated as CL—Rail Car. The term "longitudinally inboard", or "longitudinally outboard" is a distance taken relative to a mid-span lateral section of the car, or car unit.

FIGS. 1a, 1b, 2, 3a and 3b

By way of general overview, an example of a coil car is indicated in FIGS. 1a, 1b, 2, 3a, and 3b, generally as 20. For the purposes of conceptual explanation of the embodiments illustrated in the various Figures, the major structural elements of coil car 20 (and of the alternate embodiments described herein), are both symmetrical about the longitudinal centerline of the car (as designated by axis CL) and symmetrical about the mid-span transverse section of the car, indicated as TS.

Figure 1B:
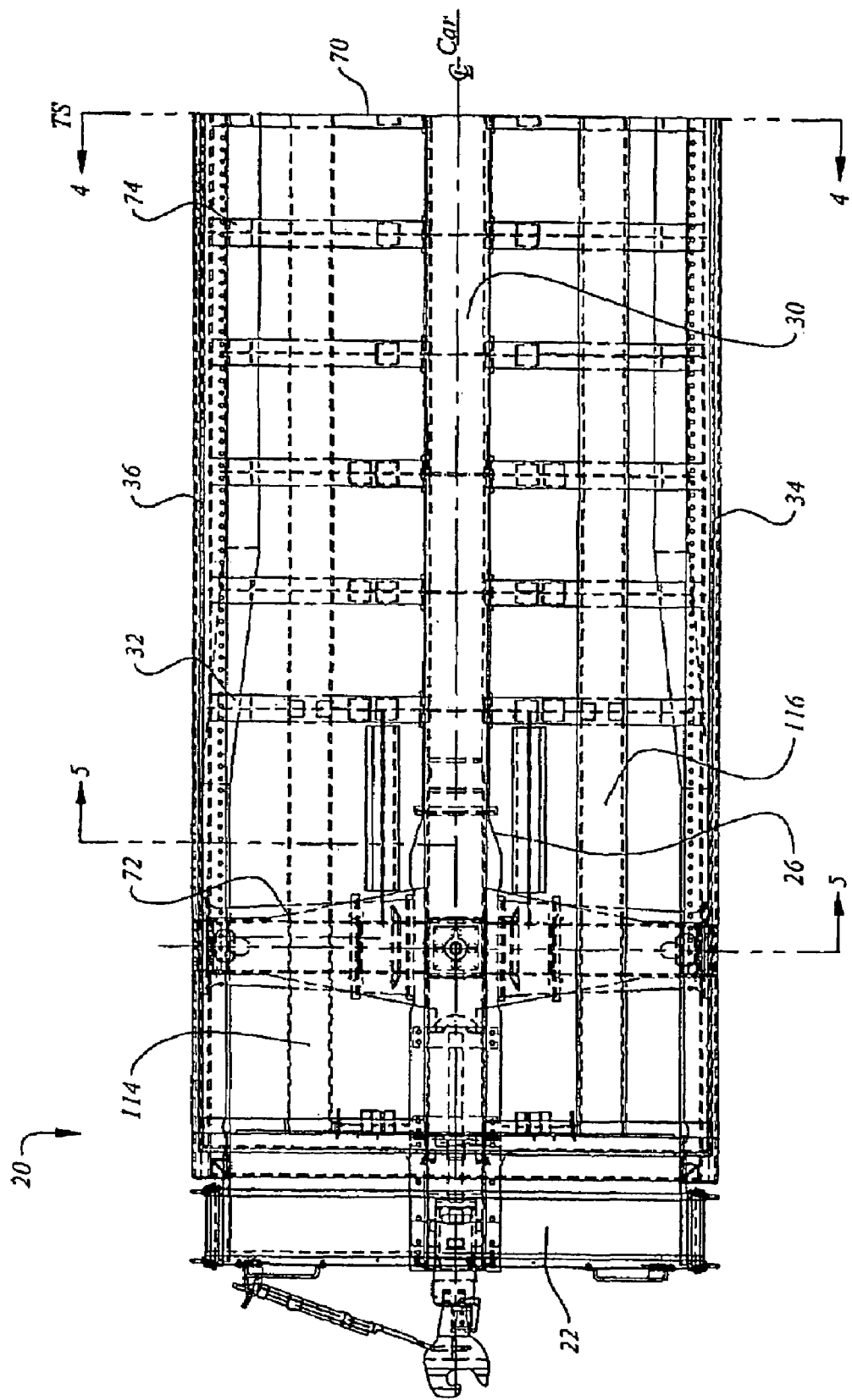
FIG. 1b is a top view of the coil car of FIG. 1a with decking removed to show the structural skeleton of the coil car.
Figure 2:
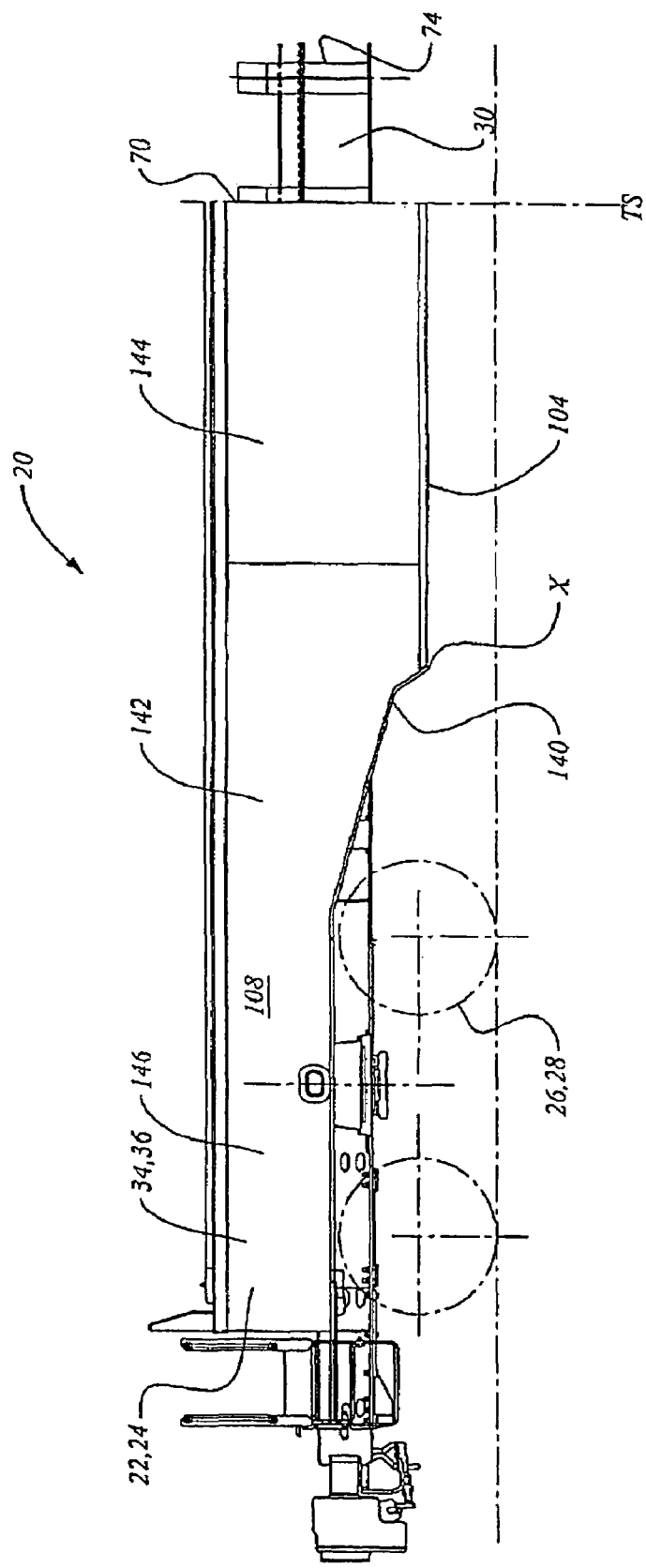

As shown in FIGS. 1a, 1b and 2, coil car 20 has a longitudinal rolling direction, on straight track, parallel to the longitudinal centerline CL. Coil car 20 includes a pair of end structures 22 and 24. End structures 22 and 24 are mounted on a pair of spaced apart rail car trucks 26 and 28, respectively. Side sills 34 and 36 extend between end structures 22 and 24 and form the main longitudinal structural elements of coil car 20 for resisting vertical loads. An array of cross-members 32 extends outwardly and away from center sill 30 to attach to side sills 34 and 36. A trough structure for carrying coils, generally indicated as 38, is mounted to, and suspended between, side sills 34 and 36.

As shown in FIG. 3a, trough structure 38 has three parallel, longitudinally extending cradles or troughs— a central trough 40 lying between two laterally outboard outer troughs 42 and 44. Each trough is shaped to cradle steel coils, or other similar, generally cylindrical coiled loads, between its inwardly and downwardly sloping shoulders, namely sloped plates 46 and 47, 48 and 49, 50 and 51, respectively. More generally, in each of the embodiments described herein each pair of opposed sloped plates defines the flanks of a valley, or trough, for cradling coils, and each of the valleys has a flat valley bottom, as described below. Each valley is centered over a longitudinally extending structural member, whether a center sill or a stringer spaced laterally outboard of the center sill, as described below, with the upper face of the longitudinal structural member also defining the valley bottom. Sloped plates 46 and 47, 48 and 49, 50 and 51 are lined with cushioning in the nature of wood decking 52 that acts as a cushion to buffer coils during loading or travel. This geometry defines longitudinally oriented troughs, that is, troughs in which the winding axis of the coils will be parallel to the longitudinal, or rolling, direction of the rail car. Load stabilising partitions in the nature of end bulkheads 54 and moveable bulkheads, namely coil stops (not shown), discourage longitudinal sliding of coils loaded in troughs 40, 42 and 44.

Describing now the arrangement of troughs 40, 42 and 44 within trough structure 38, outer troughs 42 and 44 are arranged on either side of central trough 40. Central trough 40 lies directly above center sill 30. When arranged in this fashion, a portion of the upper flange 60 of center sill 30 forms the bottom of the valley of central trough 40. Central trough 40 is carried lower relative to TOR than outer troughs 42 and 44 as indicated in FIG. 3a by dimension 6. Outer troughs 42 and 44 are mounted above stringers 114 and 116 respectively and are carried at the same height as each other relative to TOR. Having outer troughs 42 and 44 carried at a different height than central trough 40, may tend to facilitate placement of the coils in a position to tend to encroach upon or to marginally overlap each other to some extent such that a greater width of coils can be accommodated in a somewhat narrower width of coil car than might otherwise be the case.

Figure 3B:
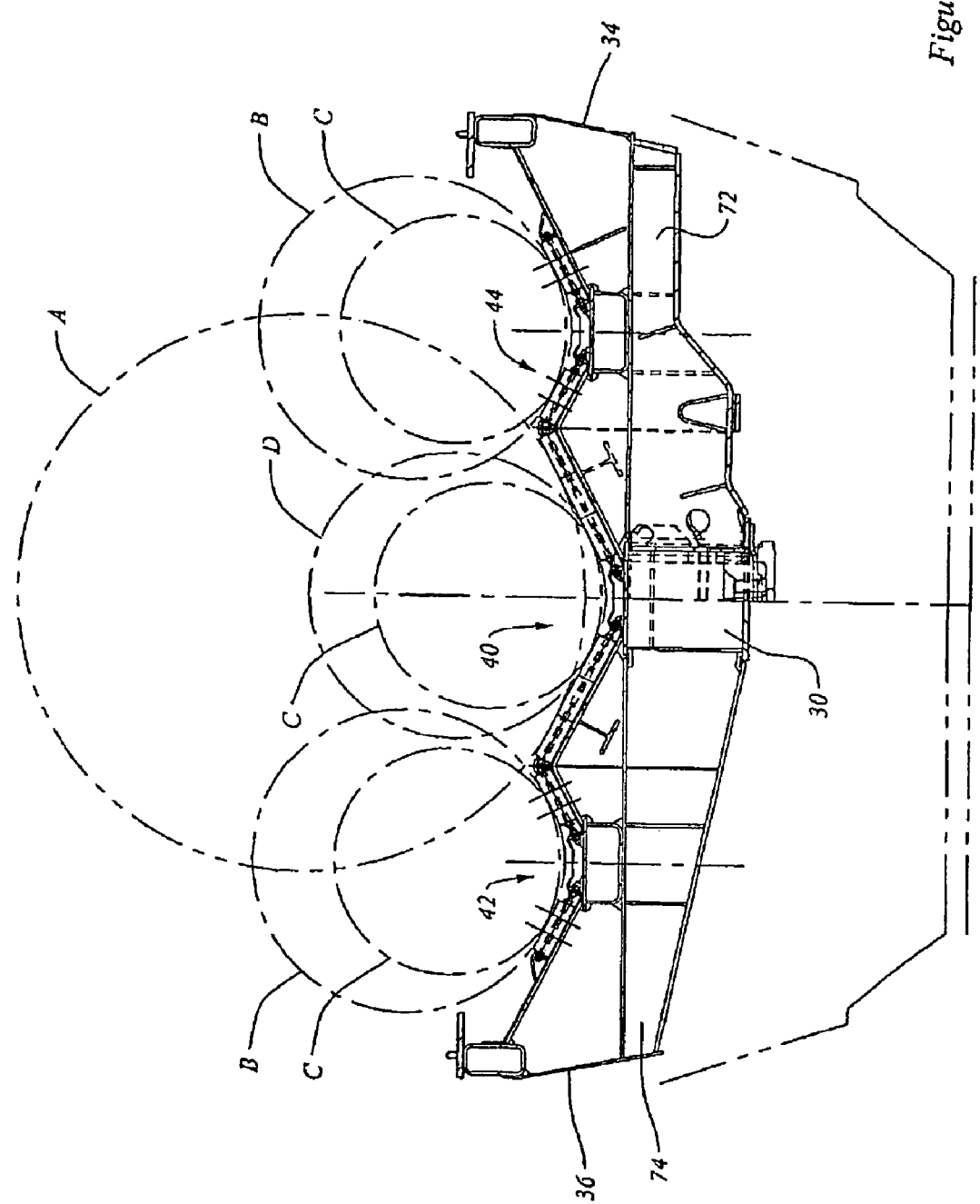

Troughs 40, 42 and 44 can accommodate various sizes of coils, as illustrated by the outlines of coils A, B, C, D in FIG. 3b. When coils are not carried in outer troughs 42 and 44, central trough 40 can carry a coil having a maximum diameter of 74 inches as indicated by coil 'A'. The largest diameter of coil that can be accommodated by outer troughs 42 and 44, as illustrated when central trough 40 is not loaded, is 40 inches as indicated by coils 'B'. Coils C and D illustrate lading conditions for all three troughs at once.

In greater detail, center sill 30 includes upper flange 60, a pair of parallel vertical webs 62 and 64 and a lower flange 66, all arranged in a rectangular box-shaped form in which the outboard margins of upper flange 60 and lower flange 66 extend past webs 62 and 64, as shown in FIG. 3a. Center sill 30 is of substantially constant cross-section in the medial span between trucks 26 and 28. Internal gussets 68 are welded inside center sill 30 to provide web continuity at each cross-bearer location.

The array of cross-members 32 extends between side sill 34 (or 36, as the case may be) and center sill 30. Array 32 includes bolsters 72 and cross-bearers 74. Bolsters 72 are located amidst end structures 22 and 24, above railcar trucks 26 and 28. Cross-bearers 74 are spaced apart one from another at successive longitudinal stations along center sill 30 between end structures 22 and 24. As shown in FIG. 3a, each of cross-bearers 74 has a web 76, an upper flange 78 and a lower flange 80. Upper flange 78 is carried at the level of upper flange 60 of main center sill 30, and is welded at its proximal, or inboard, edge thereto. Similarly, lower flange 80 is carried horizontally at the level of, and has its inboard edge welded to, lower flange 66. Web 76 extends from web 64 of center sill 30 beyond the outboard, or distal, ends of upper and lower flanges 78 and 80 to form a substantial tongue, or tab 82 suitable for welding in a lap joint to web stiffeners of the structure of side sills 34 and 36, as shown in FIG. 3a.

In terms of major structural elements (that is, excluding handrails, brake line fittings, and ancillary items), coil car 20 is symmetrical about center sill 30, such that the structure of side sills 34 and 36 is the same. Consequently, a description of one will also serve to describe the other. Referring to FIG. 3a, side sill 36 has an upper flange assembly 86, a lower flange assembly 88, and an intermediate structure 90 in the nature of a web, or webbing 92.

Examining each of these in turn, upper flange assembly 86 has a top chord member 94 in the nature of a hollow rectangular steel tube 96, upon which pin locating plate 98 is mounted. Plate 98 has an inwardly extending perforated strip or tongue 100, the perforations having a constant pitch, and being of a size and shape suitable for engagement by the locating pins of moveable bulkheads or cross-beams, namely the coil stops (not shown), used for providing longitudinal restraint of the coiled materials once loaded. Also located intermittently along a more laterally outboard region of plate 98 are eyes 102 for locating a cowling or cover (not shown) to protect coils loaded on coil car 20 from exposure to rain or snow. Lower flange assembly 88 includes a bottom chord member 104 in the nature of a hollow rectangular steel tube 106.

Webbing 92 extends between, and connects upper flange assembly 86 and lower flange assembly 88. Webbing 92 includes an upwardly and outwardly inclined steel web in the nature of a side panel sheet 108. Sheet 108 is reinforced at the longitudinal station of each successive cross-bearer by a web stiffener, or brace, in the nature of a section of channel 110. Channel 110 extends between tubes 96 and 106 along the inner face of sheet 108. Channel 110 is a C-channel having its back facing inward and its toes welded to sheet 108. Channel 110 provides an attachment site for tab 82 of cross-bearer 74 to allow mounting of cross-bearers 74 to side sills 34 and 36. Specifically, the sides, or legs, of channel 110, each lie in a vertical plane perpendicular to the longitudinal centerline of car 20. As such one side of channel 110 is aligned with the web of each successive cross-bearer 74 and thereby provides a lap surface to which respective tabs 82 of each cross bearer 74 are welded in a lap joint. Sheet 108 has an upper strip, or margin, that is bent to provide an overlapping band welded at a lap joint to the outer face of rectangular steel tube 96. Similarly, the lower margin, or band, of sheet 108 overlaps, and is welded in a lap joint to, the outer face of the bottom chord member, namely tube 106.

A gusset 112 provides vertical web continuity at the longitudinal station of the web of each cross-bearer 74 to that portion of channel 110 extending to a height lower than horizontal lower flange 80. Gusset 112 extends downward to meet the uppermost side of the bottom chord member, namely tube 106, gusset 112 being smoothly radiused on its most inboard edge to tend to reduce the stress concentration that might otherwise develop at the juncture between cross-bearer 74 and side sill 34, or 36 as may be.

Longitudinal structural elements, in the nature of stringers 114 and 116, noted above, are mounted upon cross bearers 74 at a medial location along upper flange 78 somewhat more than half way from the car centerline CL to the distal, or outboard, extremity of cross bearer 74. Each stringer 114 and 116 spans the length of coil car 20 and is mounted to cross-bearers 74 intermediate center sill 30 and each side sill 34 and 36. Stringers 114 and 116 are secured by welding to trough structure 38 and top flange 78 of cross-bearers 74. Stringers 114 and 116 function to bridge the gap, or space, between adjacent cross-bearers and so to tie cross-bearers 74 together in their midst, (i.e., at a transversely mid-span location lying between center sill 30 and side sill 34 or 36 as the case may be), and also provide the backbone of side troughs 42 and 44. Each of stringers 114 and 116 has a hollow, closed section made by employing an upwardly opening channel 118 and welding a cover or closure plate 119 across its toes. Sloped outboard and inboard side plates 46 and 47 (or 51 and 50), respectively, extend on an upward slope away from closure plate 119, the junctures of plates 46 and 47 (or 51 and 50) with closure plate 119 occurring above the respective toes of channel 118. At its outboard edge, sloped side plates 46 and 51 are each welded in a lap joint to the inboard face of tube 96 of top chord assembly 94.

Vertical web continuity is provided by a web plate, or outboard web 124 located in the same plane as web 76 of cross bearer 74. Gusset 124 has a lower edge welded to upper flange 78 of cross bearer 74, and extends upwardly therefrom to connect to a sloped flange 125 that lies against the underside of sloped side plate 46. An inboard toe of gusset 124 abuts the outboard upwardly extending leg of channel 114, (or 116) and an outboard edge of gusset 124 is welded in a lap joint to one of the legs of channel 110 of intermediate structure 90. Web stiffeners 126 are welded to both the fore and aft faces of gusset 124. Web stiffeners 126 extend between sloped flange 125 and flange 78, perpendicular to sloped flange 125, from a location under the mid-point of cushioning decking 52, to discourage buckling of gusset 124.

An inboard web 128 is also located at the longitudinal station of the plane of the web of cross member 74 and has a first, lower, edge abutting flange 78, an outboard toe abutting the inboard upturned leg of channel 118, a first upper inclined edge abutting sloped flange 127 directly below shoulder plate 50 (or 47) of outer trough 44 (or 42), and a second upper inclined edge abutting sloped flange 129 directly below shoulder plate 49 (or 48) of trough 40. Flanges 127 and 129 can be fabricated from a single piece of flat bar bent to form the vertex between trough 40 and trough 42 (or 44). Web stiffeners 130 are provided to extend from inclined flange 129 to flange 78, web stiffeners 130 running perpendicular to shoulder plate 49 (or 48) from a point in the midst of decking 52. Further web stiffeners 132 run perpendicularly from flange 78 to the vertex formed at the intersection of shoulder plates 49 and 50. Further gussets 134, 136, and 138 are located between, and run vertically perpendicular to, flanges 78 and 80 at locations directly beneath web stiffeners 132 and the toes of channel 118.

Side sills 34 and 36 have an inclined orientation with respect to the vertical, as noted above. That is, webbing 92 is inclined at an angle η from the vertical such that the width $W_1$ measured across respective top chords 88 of side sills 34 and 36 is greater than the width $W_2$ measured across respective bottom chord members 104 of side sill 34 and 36. (For the purposes of illustration ($W_1$/2) and ($W_2$/2) have been shown as measured from the centreline CL). Bottom chord members 104 are located at a height relative to TOR that is lower than the lower flange 66 of center sill 30. It is advantageous for the top chords of the side sills to be widely spread to tend to increase the trough width, and hence the maximum coil diameters that can be carried within the AAR plate B width limit. At the same time, increasing the depth of section to increase the second moment of area, and hence resistance to flexure under vertical loading, may tend to encourage use of bottom chords that are stepped laterally inward relative to the top chords, as shown, to fall within the inwardly sloping underframe limit such as is permitted under AAR plate "B" or plate "C" envelope shown in dashed lines and indicated as "UF".

Although different angles could be used for the slopes of the sides of central trough 40 and side troughs 42 and 44, in the embodiment illustrated in FIG. 3*a* they are the same. Their angle, (that is, the angle of sloped sheets 46, 47, 48, 49, 50 and 51) when measured from the horizontal, is greater than 20 degrees, and in general lies in the range of 23 to 29 degrees. It is preferable that the angle be greater than 24.22 degrees, (at which L/V=0.45) and less than 28 degrees, and it is most preferred that the angle be 27 degrees or thereabout.

Side sills 34 and 36 have a maximum depth of section at mid-span 70 to provide resistance against the bending moment induced by the loads carried by coil car 20. Considering the side view of FIG. 2, moving away from the mid-span 70, the portion of side sill 34 having the greatest depth of section ends at a point designated as "X" in FIG. 2. At point "X" bottom chord member 104 is obliquely truncated and welded to a doglegged upswept fender, or flange 140. Upswept flange 140 follows the lower edge of sheet 108 as it narrows in a transition portion 142 from the deep, mid-span or medial portion 144 to the narrow, or shallow, end structure portion 146, the upswept flange 140 reaching a sufficient height to clear trucks 26 and 28, as the case may be.

Figure 4:
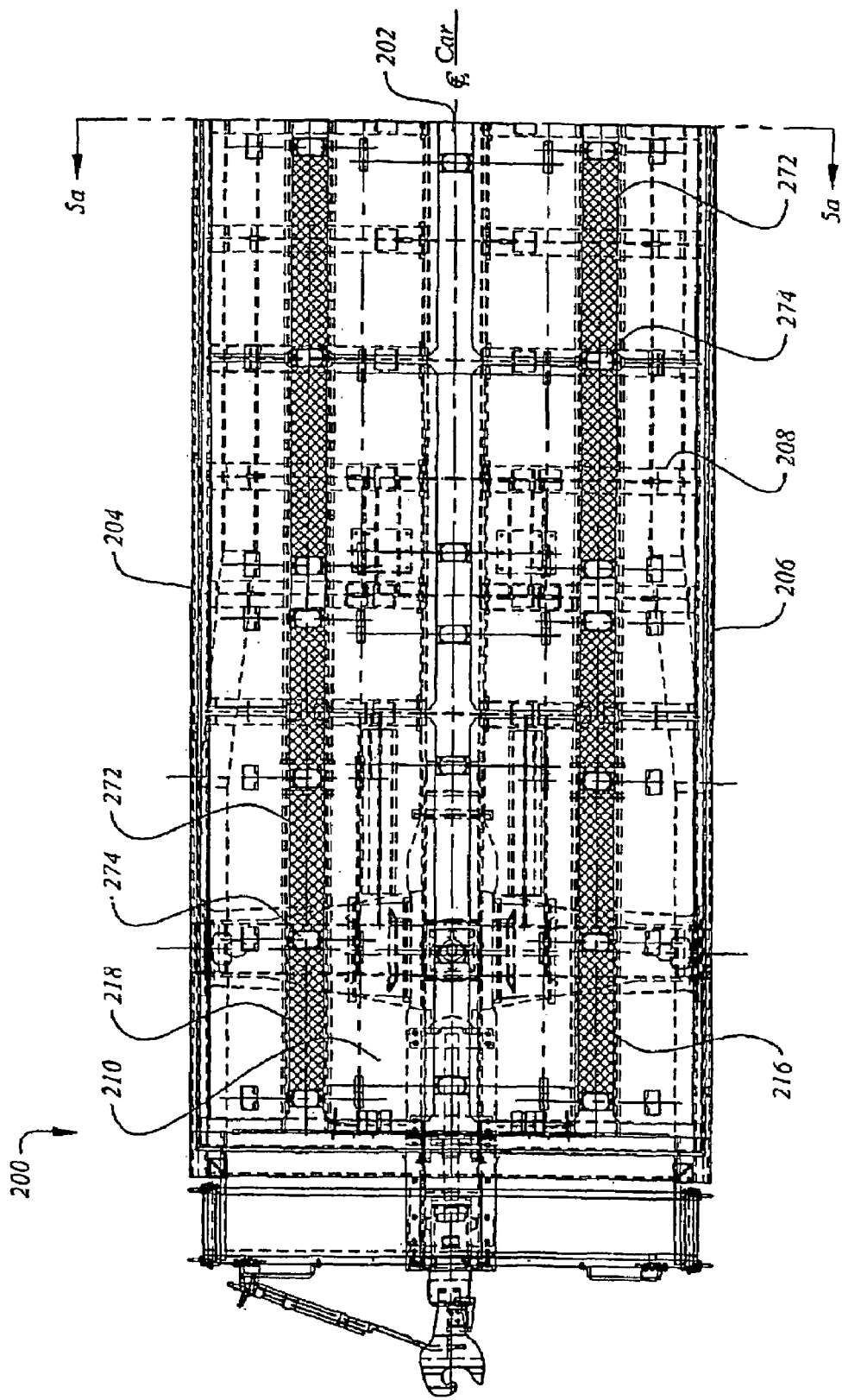
Figures 5A, 5C:
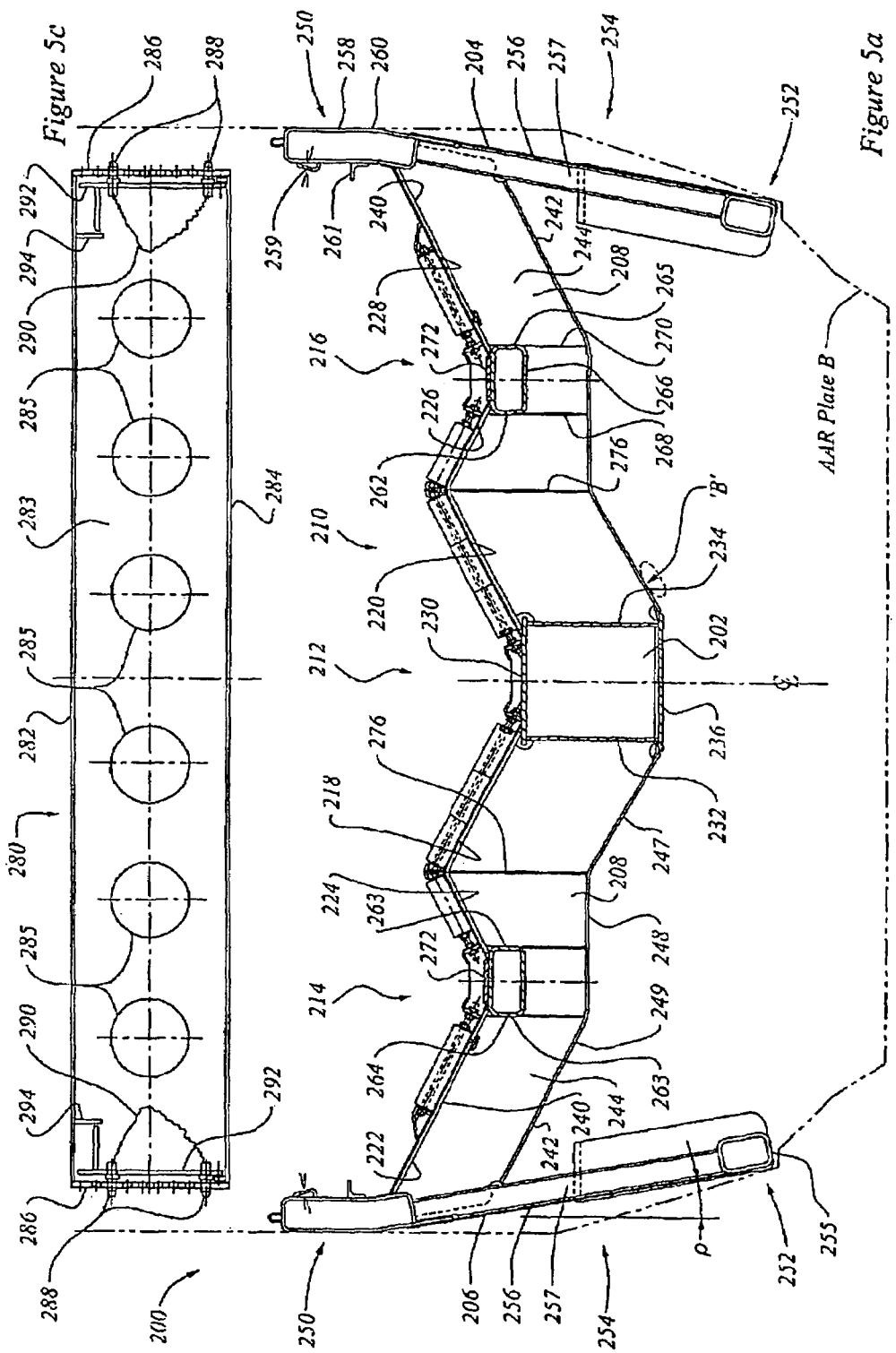
FIG. 5a is a cross-sectional view of the coil car of FIG. 4 at mid-span, showing a triple trough arrangement having cross-bearers with a stepped lower flange.
FIG. 5c shows a top view of a coil stop of the coil car of FIG. 5b.
Figure 5B:
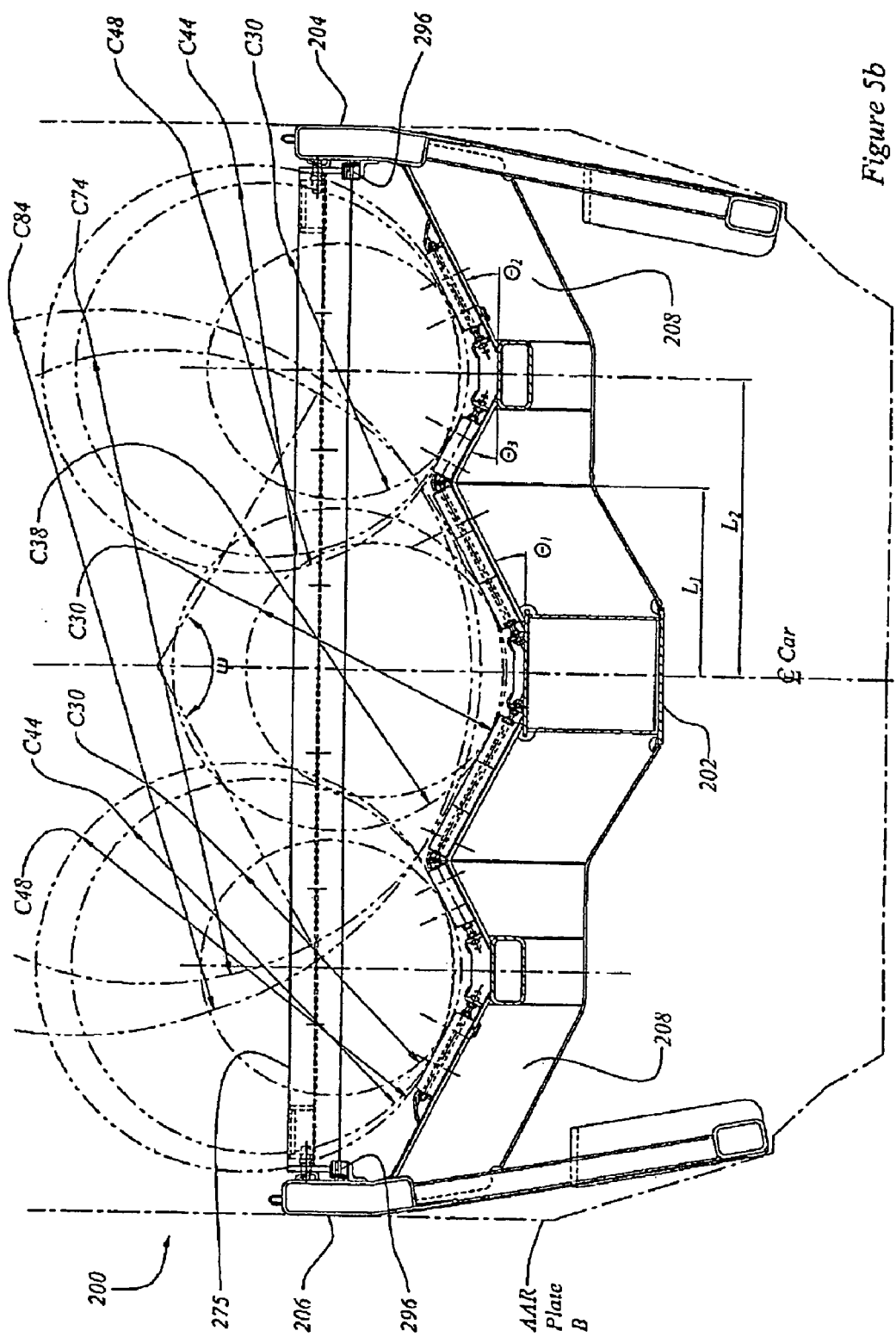
FIG. 5b shows the cross-section of FIG. 5a with coils of various loading configurations shown thereon.

FIGS. 4, 5*a* and 5*b*

Referring to FIGS. 4, 5*a* and 5*b*, in another embodiment a coil car is generally indicated as 200. Coil car 200 is generally similar to coil car 20. It has a center sill 202, a pair of side sills 204 and 206 and cross-bearers 208 for tying side sills 204 and 206 to center sill 202. The arrangement of center sill 202, cross-bearers 208 and side sills 204 and 206 support a trough structure 210. Trough structure 210 has three parallel, longitudinally extending troughs 212, 214 and 216. Each trough is shaped to cradle steel coils, or other similar loads, between its inwardly and downwardly sloping opposed flanks, or shoulders plates 218 and 220, 222 and 224, 226 and 228, respectively.

Center sill 202 is similar to center sill 30 of coil car 20. It includes an upper flange 230, a pair of parallel vertical webs 232 and 234 and a lower flange 236, all arranged in a rectangular box-shaped form in which the outboard margins of upper flange 230 and lower flange 236 extend past webs 232 and 234.

Each cross-bearer 208 has an upper flange 240, a lower flange 242 and a web 244. Unlike upper flange 78 of coil car 20, upper flange 240 is carried above the level of upper flange 230 of center sill 202, and lies against the underside of trough structure 210. As upper flange 240 extends from side sill 204 and 206, it slopes downwardly and upwardly, as the case may be, to match the orientation of shoulder plates 218, 220, 222, 224, 226 and 228. Web 244 extends between lower flange 242 and trough structure 210. At its outboard end or tip, web 244 is welded to the structure of side sills 204 and 206 in a lap joint. As above, the upper flanges of the center sill and longitudinal stringers form the bottom of the valley of the respective troughs.

Lower flange 242 is a stepped lower flange carried at a level higher than the lower flange 236 of center sill 202. At its inboard edge, lower flange 242 has an inboard portion 247 welded to lower flange 236. Inboard portion 247 extends on an upward slope outboard and away from lower flange 236 to join a horizontal transition portion 248. In turn, transition portion 248 joins an upwardly sloped portion 249 that extends toward side sill 206 or 208, as the case may be. The sloped portion 249 of lower flange 236 has been trimmed short of side sill 204 or 206. The upward slope of inboard portion 247 provides a larger space, indicated generally as 'B' in which to locate a brake line. This is advantageous, since it is not then necessary to punch a hole through web 244 for the brake line, saving fabrication and installation costs, and avoiding a stress concentration in web 244.

Each side sill 204, 206 has an upper flange assembly 250, a lower flange assembly 252, and an intermediate structure 254 in the nature of webbing 256. Upper flange assembly 250 has a top chord member 258 in the nature of a hollow generally rectangular steel tube 260. Steel tube 260 is a formed section having a lower portion on a dog leg bend to match the angle of inclination ρ of webbing 256. Unlike top chord 94 of coil car 20, top chord 258 is not provided with an inwardly extending plate such as plate 98 for locating the pins of the moveable bulkheads (not shown), thus tending to permit trough structure 210 to accommodate coils of a larger diameter within the limits of AAR plate B than would otherwise be the case. Rather a perforated formed channel, or strip, 259 is mounted along the face of the inner web of top chord 258, the perforations serving as sockets for receiving, and retaining, the lugs of a coil stop 280 described below. An angle iron 261 is welded along the inboard face of the inboard web of top chord member 258, to bear the weight of the coil stop. That is, the coil stop can slide along angle iron 261 and be locked in place by seating removable pins in strip 259 as described below. The arrangement of lower flange assembly 252 and webbing 256 is generally similar to that described earlier in respect of lower flange assembly 88 and webbing 92 of coil car 20.

Longitudinal structural elements in the nature of stringers 262 and 264 are mounted upon cross bearers 208 at a medial location along web 244 somewhat more than half way from the car centerline CL to the distal, or outboard, extremity of cross bearer 208. Stringers 262 and 264 seat in pockets or recesses 263 and 265 formed in web 244. Stringers 262 and 264 function to tie cross-bearers 208 together in their midst, i.e., at a mid-span location, and also provide the backbone of side troughs 214 and 216. Each stringer 262, 264 has a hollow, rectangular steel section in the nature of a tube 266. Respective sloped side plates 224 or 226 and 222 or 228 each have a lip welded to the respective inboard and outboard uppermost corners of tube 266 and extend on an upward slope away therefrom. At its outboard edge, sloped side plate 222 (or 228) has a bent lip welded in a lap joint to the inboard face of tube 260 of top chord assembly 258. The undersides of sloped side plates 224 (or 226) and 222 (or 228) are welded to the undulating upper flange 240 of cross-bearer 208.

Tread plates, generally indicated as 272, are mounted to the top surface of tube 266 intermediate attachment sites 274 where wood decking 52 is fastened to trough structure 210, as best shown in FIG. 4. The arrangement of tread plates 272 in this way does not interfere with wood decking 52 mounted within outer troughs 214 and 216. Similarly, tread plates 272 are generally sufficiently thin so that when coils are loaded in outer troughs 214 and 216, the coils do not touch tread plates 272 thereby tending to avoid damage by tread plates 272. Tread plates 272 provide a no-skid roughened surface to the walkways defined in the valley bottoms and tend to permit railway personnel to secure a coil during loading of coil car 200. The walkways so defined are fixed in position relative to the trough structure, and do not require special mechanisms for deployment or retraction.

Web stiffeners 276 run perpendicular to lower flange 242 to intersect the vertex formed at the intersection of shoulder plates 224 and 218, and 220 and 226. Further gussets 268 and 270 are located between, and run vertically perpendicular to lower flange 242 and the lowermost corners of tube 266.

The arrangement of troughs 212, 214 and 216 is generally similar to that of troughs 40, 42 and 44 of coil car 20. Outer troughs 214 and 216 are arranged on either side of central trough 212. Central trough 212 lies directly above center sill 202 and is carried lower relative to TOR than outer troughs 214 and 216. Each outer trough 214 and 216 is mounted above stringers 262 and 264 and carried at the same height relative to TOR as the other.

Troughs 212, 214 and 216 can accommodate various sizes of coils, as illustrated by the outlines of coils shown in FIG. 5b. When coils are not carried in outer troughs 214 and 216, central trough 212 can carry a coil having a maximum diameter of 84 inches. The largest diameter of coil that can be accommodated by outer troughs 214 and 216, when central trough 212 is not loaded, is 48 inches.

As noted above in the context of coil car 20 of FIGS. 1a, 1b, 2, 3a and 3b, troughs 212, 214 and 216 of FIGS. 4, 5a and 5b have slope angles, indicated in FIG. 5b as $\theta_1$, $\theta_2$ and $\theta_3$. In general, these angles need not be the same, although it is convenient, and preferred, that a single angle be chosen. The range of angles chosen for any of $\theta_1$, $\theta_2$ and $\theta_3$ is greater than 20 degrees. As above, the angles can be chosen in the range of 23 to 29 degrees, preferably being 24.2 or more, and 28 degrees or less, and most preferably being about 27 degrees.

In the embodiment illustrated in FIGS. 5a and 5b, in single coil mode, central trough 212 can cradle a coil up to 84 inches in diameter, as indicated in dashed lines as C84. A 74 inch coil is indicated as C74. Similarly, in a two-coil loading configuration, each of the outboard troughs 214 or 216 can accommodate a coil of up to 48 inches, indicated as C48. In the triple coil configuration each of the troughs can hold a 30 inch coil, indicated as C30. Alternatively a 38 inch diameter coil, indicated as C38, can be accommodated in central tough 214 while two 30 inch coils are cradled in outer troughs 212 and 216.

A transversely extending member, or cross beam member, is indicated as 275, and spans the trough structure from side sill 206 to side sill 204. As illustrated in FIG. 5b, member 275 is in a position to restrain longitudinal motion of coils mounted in any of the three troughs. As indicated by angle $\Psi$, when measured at mid-height (in this case, at the level of its horizontal web) cross beam member 275 subtends a portion of a minor arc of coil C74. In the preferred embodiment $\Psi$ is greater than 108 degrees, typically being about 122 degrees for coil C74 and about 112 degrees for coil C84.

The movable cross-beam member 275, namely coil stop 280, is shown in FIGS. 5b and 5c. It has the general form of an I-beam set on its side such that flanges 282, 284 of the I-beam stand in vertical planes perpendicular to the longitudinal centerline of car 200, and web 283 lies in a horizontal plane between the flanges. Web 283 is perforated, having a number of apertures in the nature of round holes 285 formed in it to reduce its weight. An end plate 286 is welded across each end of the I-beam, each end plate having through holes for accommodating locating releasable retainers in the nature of pins 288. Each pair of locating pins is joined by a lanyard 290. Lanyard 290 is preferably a cable but could also be a wire, cable, chain or strap. In use, pins 288 extend through plate 286 to seat in a pair of apertures, or sockets, in strip 259, thus preventing coil stop 280 from shifting in the fore-and-aft (i.e., longitudinal) direction relative to the troughs. When so engaged, a locking member 292 pivots on a pin to bear against a shoulder of pins 288, thus preventing them from disengaging from strip 259. In use, locking member 292 is held in place by a laterally inward retainer 294 that prevents the handle of locking member 292 from moving laterally inboard. To release pins 288, the handle of locking member 292 is pivoted upwards, such that locking member 292 no longer blocks the retraction of the shoulders of pins 288. Pulling on lanyard 290 then releases pins 292, permitting coil stop 280 to be moved to a different location. A slider 296 is mounted under each of end plates 286 and bears upon angle iron 261. It is advantageous for slider 296 to have a sliding bearing surface, such as a nylon or high molecular weight polymer pad or facing.

Figure 6A:
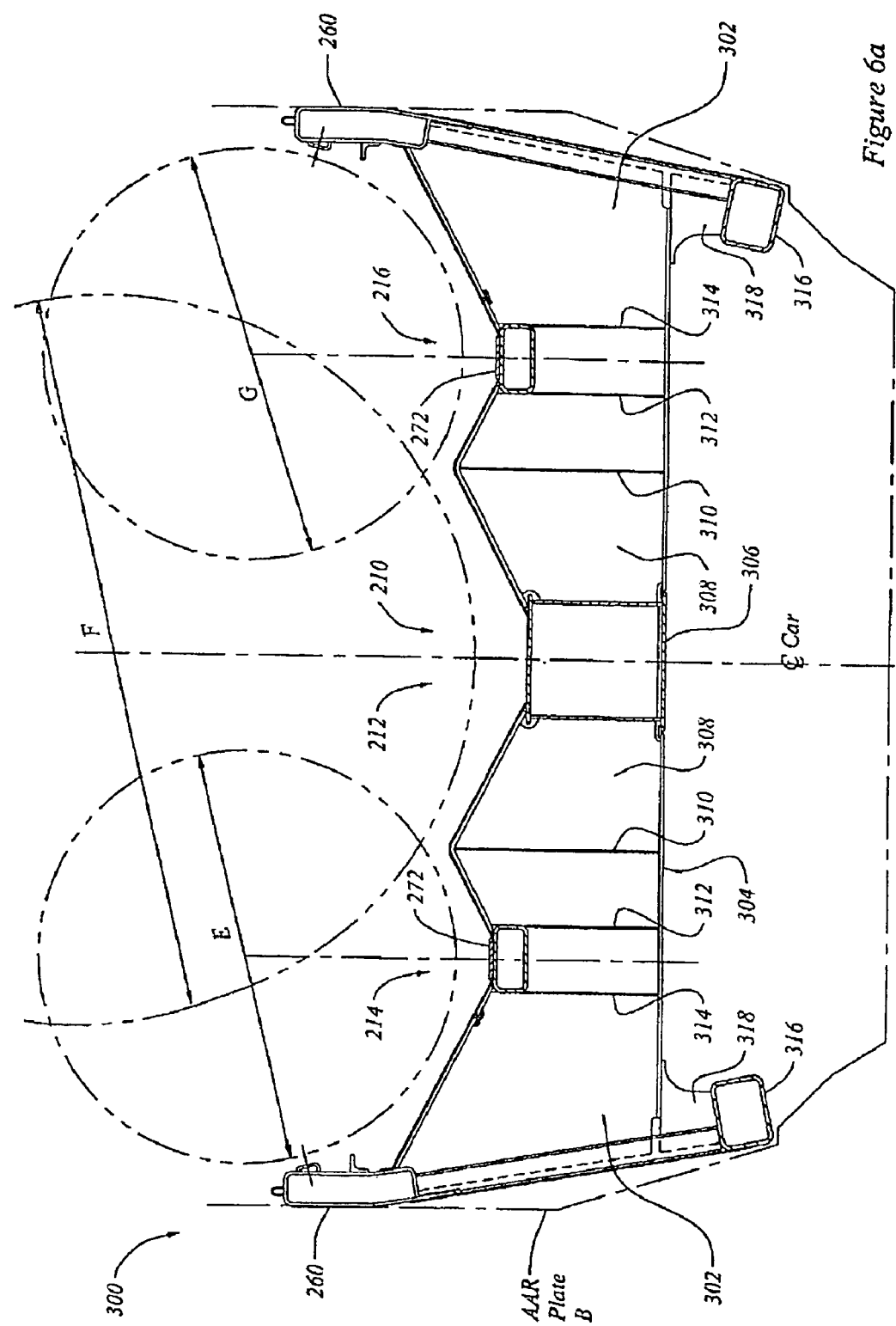
FIG. 6a shows an alternate mid-span coil car cross-section to that of FIG. 5a having a cross-bearer with a horizontal bottom flange.
Figure 6B:
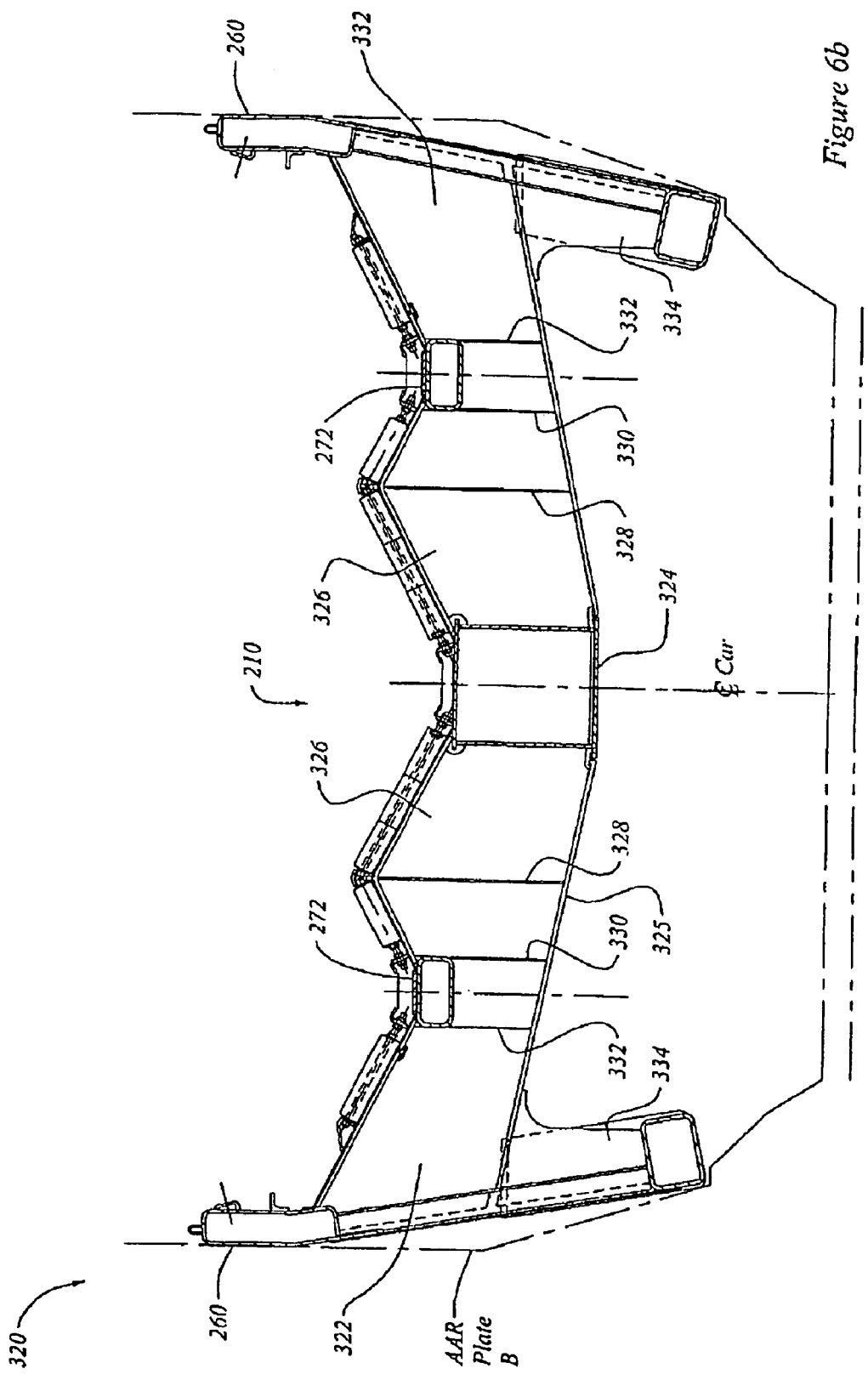
FIG. 6b shows a further alternate mid-span coil car cross-section to that of FIG. 5a, having a cross-bearer with an inclined bottom flange.
Figure 6C:
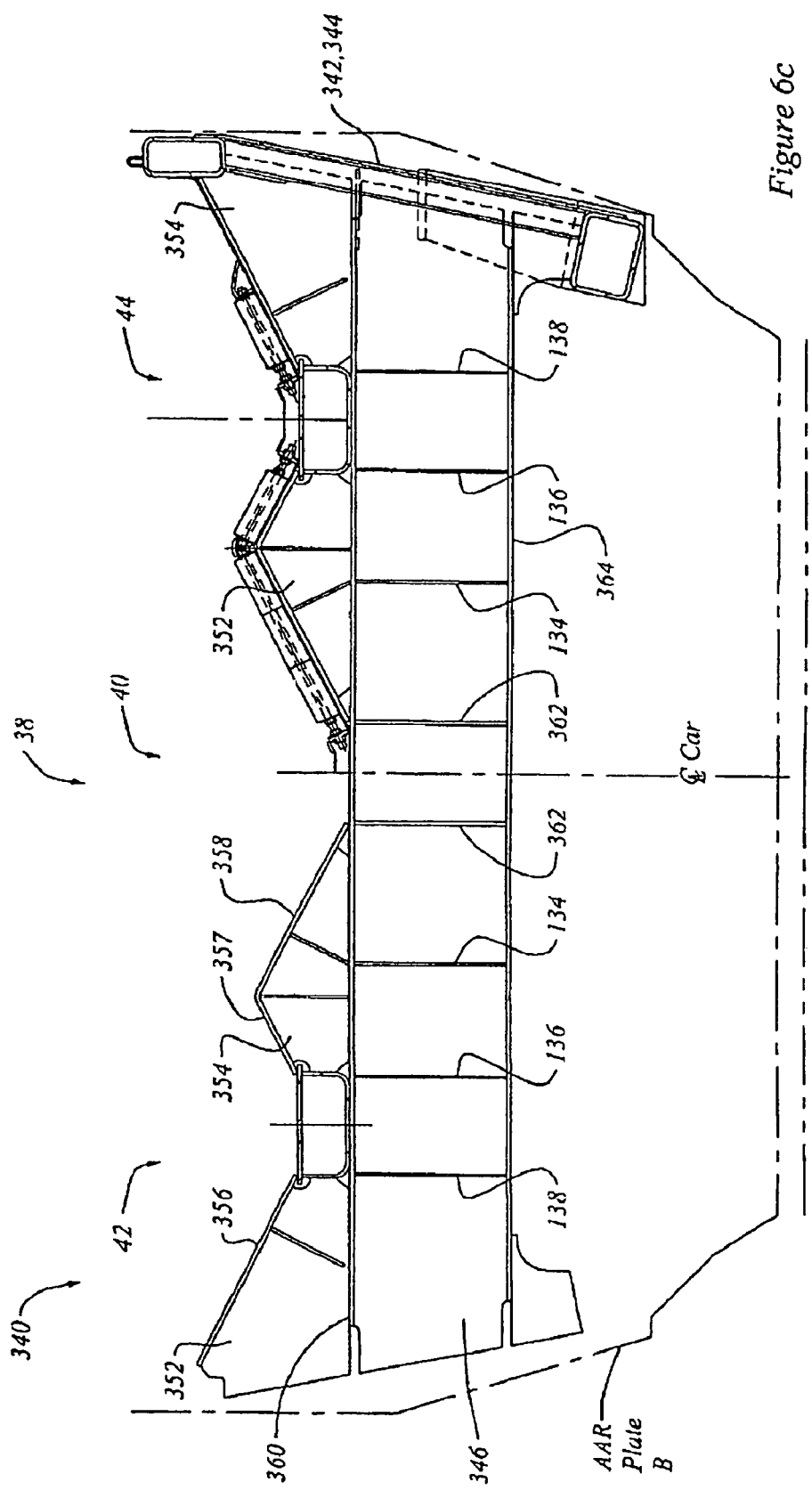

FIGS. 6a, 6b and 6c

FIG. 6a shows an alternative embodiment of coil car to that of FIGS. 4, 5a and 5b, indicated generally as 300. Coil car 300 differs from coil car 200 in that, rather than having upwardly stepped cross bearers such as cross bearers 208, coil car 300 has cross bearers 302 having a horizontal lower flange 304 carried flush with the bottom flange of center sill 306. Cross bearer 302 has a correspondingly deeper web 308, and gussets 310, 312 and 314. A further radiused gusset 318 lies in the plane of web 308 and extends between lower flange 304 and bottom chord 316. Coil car 300 has trough structure 210 as described above and employs coil stop 280, and related fittings, also as described above.

FIG. 6b shows another alternative embodiment of coil car to that of FIGS. 4, 5a and 5b, indicated generally as 320. Coil car 320 differs from coil car 200 in having cross bearers 322 having a lower flange 325 that extends in an inclined plane upward and outward from center sill 324. Corresponding changes are made in the size of web 326 of cross bearer 322, and in gussets 328, 330, 332 and 334.

In the alternative embodiment shown in FIG. 6c, a coil car 340 can be constructed without a center sill between rail car trucks 26 and 28. That is, stub sills can be employed at either end of the coil car body with no main sill between deep side sills 342 and 344. Coil car 340 has transverse structural members in the nature of cross-bearers 346 that extend as continuous beams between a pair of deep side sills 342 and 344. Gussets 352 and 354 are built up in the manner of gussets 124 and 128 noted above, to support upper flanges 356, 357 and 358, that are similar to items 125, 127 and 129, noted above. The general stringer, trough sheet and cushion structure is also similar to that of car 20. The upper flange 360 of cross bearer 346 is supported at the juncture with flanges 358 by gussets 362. Cross-bearer 346 has a continuous bottom flange 364.

FIGS. 7a, 7b, 7c and 7d

Figure 7A:
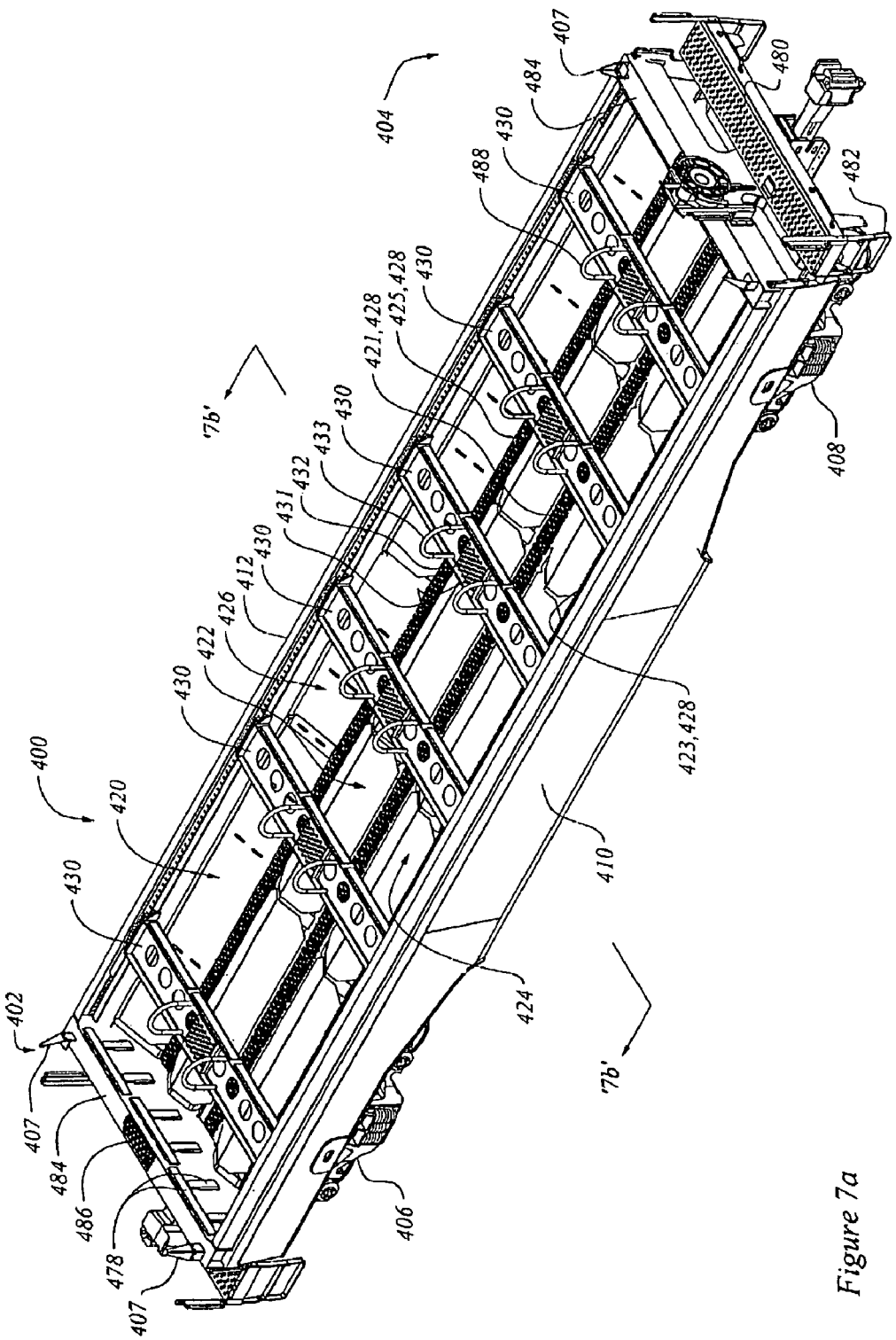
FIG. 7a shows an isometric view of an alternative embodiment of coil car to that of FIG. 1.

FIG. 7a is an isometric view of a preferred embodiment of coil car, indicated generally as 400. It has first and second end sections 402, 404, carried over spaced apart rail car trucks 406, 408. Side sills 410, 412 extend between end sections 402 and 404. A modest center sill 414 extends from end to end of coil car 400 along the longitudinal centerline, and terminates at draft pockets with draft gear and couplers in the manner of rail road cars generally. Main bolsters extend laterally outboard from center sill 414 at the truck centers to meet side sills 410 and 412. An array of cross bearers 418 is spaced along car 400, and is slung between side sills 410 and 412, and center sill 414 generally as described above in the context of car 200.

A trough structure, generally indicated as 420, is mounted above, and supported by, cross bearers 418 and between side sills 410 and 412. That is, side sills 410 and 412 extend longitudinally along the outboard edges of, and define bounds of, trough structure 420. As in the other embodiments, side sills 410 and 412 lie at, or just within, that is, within two inches of, the AAR Plate B width limits. Trough structure 420 includes a central trough 422, and left and right hand laterally outboard troughs 424 and 426, having the same structure and geometry as troughs 212, 214 and 216 of coil car 200, described above. Each of troughs 422, 424, and 426 has a walkway 421, 423, 425 with tread plates 428 located at the base, or groin, that is, the valley bottom, of the particular trough. Movable coil stops, each indicated as 430, are mounted between side sills 410 and 412 as more fully described below. Each coil stop has a stile, or step, 431 with a roughened tread plate 432 and hand grabs 433 to aid personnel in walking along the valley of central trough 422. Although six coil stops are illustrated, this is representative of any reasonable number of coil stops more generally, such as may be appropriate for anticipated loading conditions, and overall maximum car weight when loaded. Coil car 400 has a removable cover, indicated generally in FIG. 7b as 405, and cover guides 407 mounted at the corners of the car on the end bulkheads to aid in locating cover 405 in place.

Coil car 400 differs from coil car 200 in a number of respects. First, as shown in FIG. 7b, lower flange 434 of cross bearer 418 has an upwardly angled portion 435 adjoining the lower flange 436 of center sill 414, and a flat portion 437 extending from portion 435 to a distal tip next to the lap joint of web 438 with the vertical stiffener 440 of side sill 410 (or 412, as may be).

Second, the construction of coil stop 430, and its mating engagement strip of side sill 410 (or 412) differs from that of coil stop 280 and strip 259 described above. As with coil stop 280, coil stop 430 has the construction of an I-beam 442 having flanges 443 and 444 lying in spaced apart vertical planes, and a web 445 lying in a horizontal plane between flanges 443 and 444. As above, web 445 is perforated, having lightening holes indicated as 446. I-beam 442 is capped at either end by end plates 448. However, rather than the horizontal pin arrangement of coil stop 280, end plates 448 have toes 450 that extend past flanges 443 and 444 in the longitudinal direction of car 400. Toes 450 each have rollers 452 mounted to them to engage a load bearing member of the side sill, as described below. In addition, a pair of perforated bars, or strips 451 and 453 are welded to the laterally outboard faces of plates 448. Strips 451 and 453 stand in parallel horizontal planes and extend outwardly from end plates 448. The perforations 454 and 455 in strips 451 and 453 are aligned with each other. Perforations 454 and 455 are slots having an oblong shape to permit lateral tolerance in the placement of coil stop 430 relative to side sills 410 and 412.

Third, the construction of the top chord is different from that of top chord 250. As above, each of side sills 410 and 412 has the same profile, given that, in terms of primary structure, coil car 400 is structurally symmetrical both about the longitudinal centerline and the transverse central plane of the car. Each of side sills 410 and 412 has a top chord assembly, generally indicated as 456, a bottom chord indicated as 457, and a webbing assembly 458 extending between the top and bottom chords. Webbing assembly 458 includes both a web sheet 460 and stiffeners in the nature of posts 462 that extend between the top and bottom chords at longitudinal stations corresponding to the longitudinal planes of the webs of cross bearers 418, to which they are welded.

In contrast to the dog-legged closed box section of top chord 258, top chord assembly 456 includes a trapezoidal hollow tube 464 having inner and outer walls parallel to the slope angle of web sheet 460, and a perpendicular base wall. The top wall 465 of hollow tube 464 is formed to lie in a horizontal plane. An inwardly opening C-shaped formed channel member 466 has a back 467 and parallel legs 468 and 469. Leg 468 lies upon, and is welded to, top wall 465, such that back 467 stands in a vertical plane. A cowling support bracket 470, is welded to back 467. Cowling support bracket 470 has the form of an angle having a relatively tall vertical leg 471 whose toe is welded to the outboard face of back 467 of channel member 466, and a relatively short inwardly extending horizontal leg 472 that extends from the upper end of leg 471 inboard toward the car centerline. Leg 472 is a flange having sufficient width (i.e., the length of the leg from the angle to the tip of the toe) to support coil cover 405 such as commonly used on coil cars to protect the lading from rain and snow. (More generally, covers such as cover 405 can be used with each of the other embodiments described herein). The upwardly facing surface of leg 472 and the corresponding upwardly facing surfaces of end bulkheads 484 define respective longitudinal and transverse edges of a rectangular periphery bounding the trough structure. The interface surface of the boundary matches the footprint of cover 405, such that the trough structure, walkways and coil stops are carried within the footprint (i.e., within the vertical projection of area) of cover 405 when installed. Cover 405 is removable to permit loading of coils into the trough structure.

As best seen in the enlarged detail of FIG. 7c, the upper face of leg 468 provides a trackway, or bearing surface, upon which rollers 452 can travel when coil stop 430 is not locked in place. Strips 451 and 453 are carried on plates 448 at height to bracket upper leg 469 of formed channel member 468 in a sandwich arrangement. Upper leg 469 has perforations 473 such that a securement or locking member, such as pin 474, can be inserted through strip 451, leg 469 and strip 453. Pin 474 has a head 475 of sufficient size to seat on the upper face of strip 451, and a link 476 to which a cable, chain, or similar retraction means such as lanyard 290 can be attached. When pin 474 is installed, it is in a double shear condition. Two pins 474 are used at each end of coil stop 430 at any given time.

The pitch of the oval, or oblong, holes, apertures, slots or namely perforations 454 in strips 451 and 453 is slightly different from the pitch of perforations 473 in leg 469 such that a movement of less than a full pitch will cause a different set of holes to align, allowing a finer choice of positions. That is, the pitch of holes in leg 469 is 3 inches. The pitch of the slots in strips 451 and 453 is 1.8 inches. Given the 8 slot arrangement, the different pitches are such that at least 2 sets of slots and holes will line up at every 0.6 inch increment in travel along the leg 467. In this way, perforations 454 in strips 451 and 453, and perforations 473 in strip 469 act as co-operating indexing members. The pitch of one set of indexing members is different from the pitch of the other, such that the effective resolution, or incremented graduation, is less than either pitch by itself.

The mounting of rollers 452 on the extending lugs or toes 450, or lugs, of end plates 448 gives a relatively long wheelbase for coil stop 430 and facilitates operation of coil stop 430. While rollers are preferred, in an alternative embodiment a polymeric slider pad could be used in place of rollers as used in coil car 200. Nylon pads, or cushions, 477 are mounted to the outside faces of flanges 443, and 444 in a position to contact coils carried in the troughs, and tend to discourage damage to the edge of the coils. Similar pads 478 are mounted to the inward face of the end bulkheads 484.

In operation, rail yard personnel can ascend the end walkways 480 of car 400 by means of the ladders 482 located at the corners of the car. Personnel can step over end bulkhead 484 and walk along the walkways provided along any of troughs 422, 424, or 426. A step with a tread plate 486 is provided on end bulkhead 484 opposite the end of the walkway of central trough 422. In stepping over each coil stop 430 personnel can steady themselves with the assistance of the safety appliances, namely handles 433 having the form of U-shaped, downwardly opening hand rungs 488.

In the process of loading a coil, the coil stop pins are disengaged from leg 469 and coils stops 430 are urged to positions leaving a long enough space for the coil (or coils, if more than one of the troughs is being used) to be loaded. Each coil is lowered into place, typically by a crane. The next adjacent coil stops 430 are urged into position snug against the coil (or coils), or as nearly so as practicable, and the locking members, namely pins 474 are engaged as shown in FIG. 7b. Shimming or packing materials are used if required. The movement of coil stop 430 can be either by a single person working in the center trough, or by two persons co-operating to push on either side from the outer troughs. The next coil, or coils are placed in position, and further coil stops are moved into position, and so on.

Figure 8A:
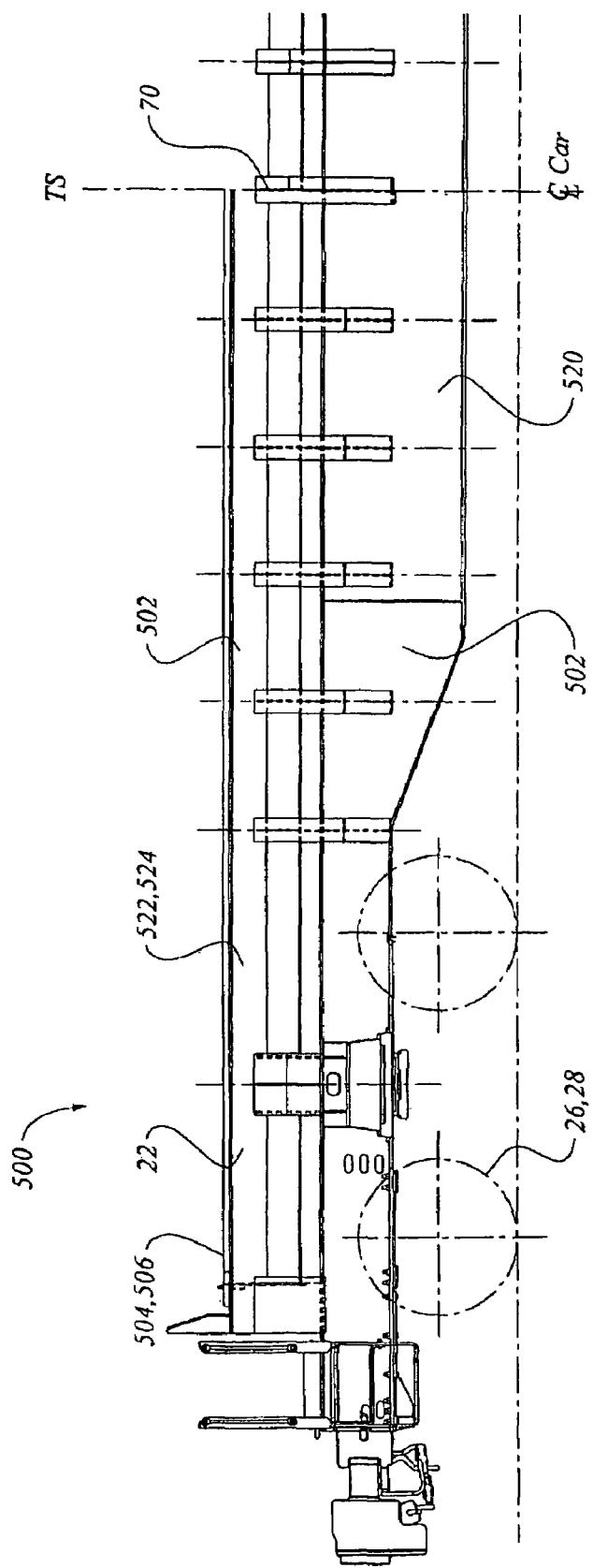
Figure 8B:
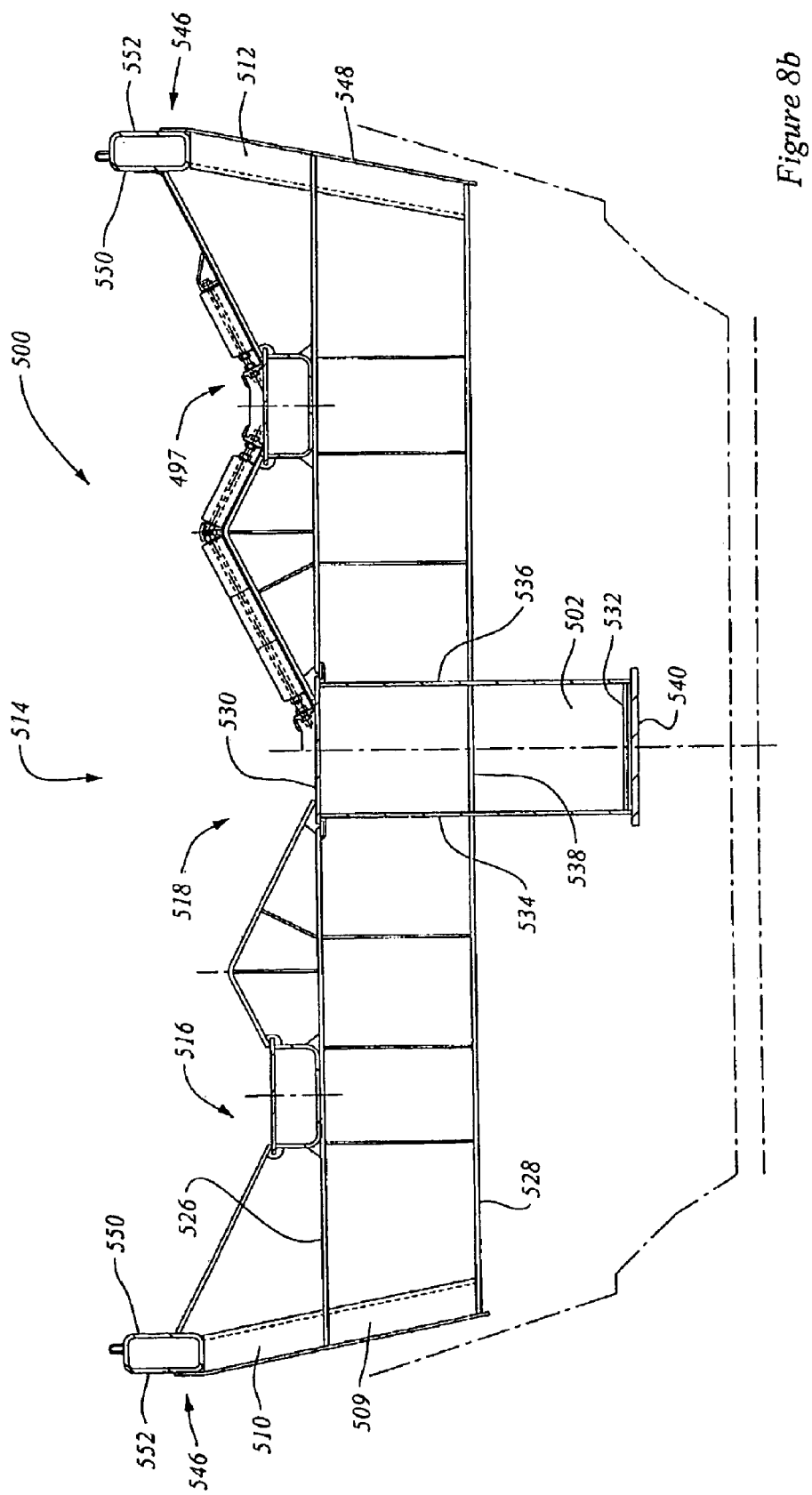
Figure 8C:
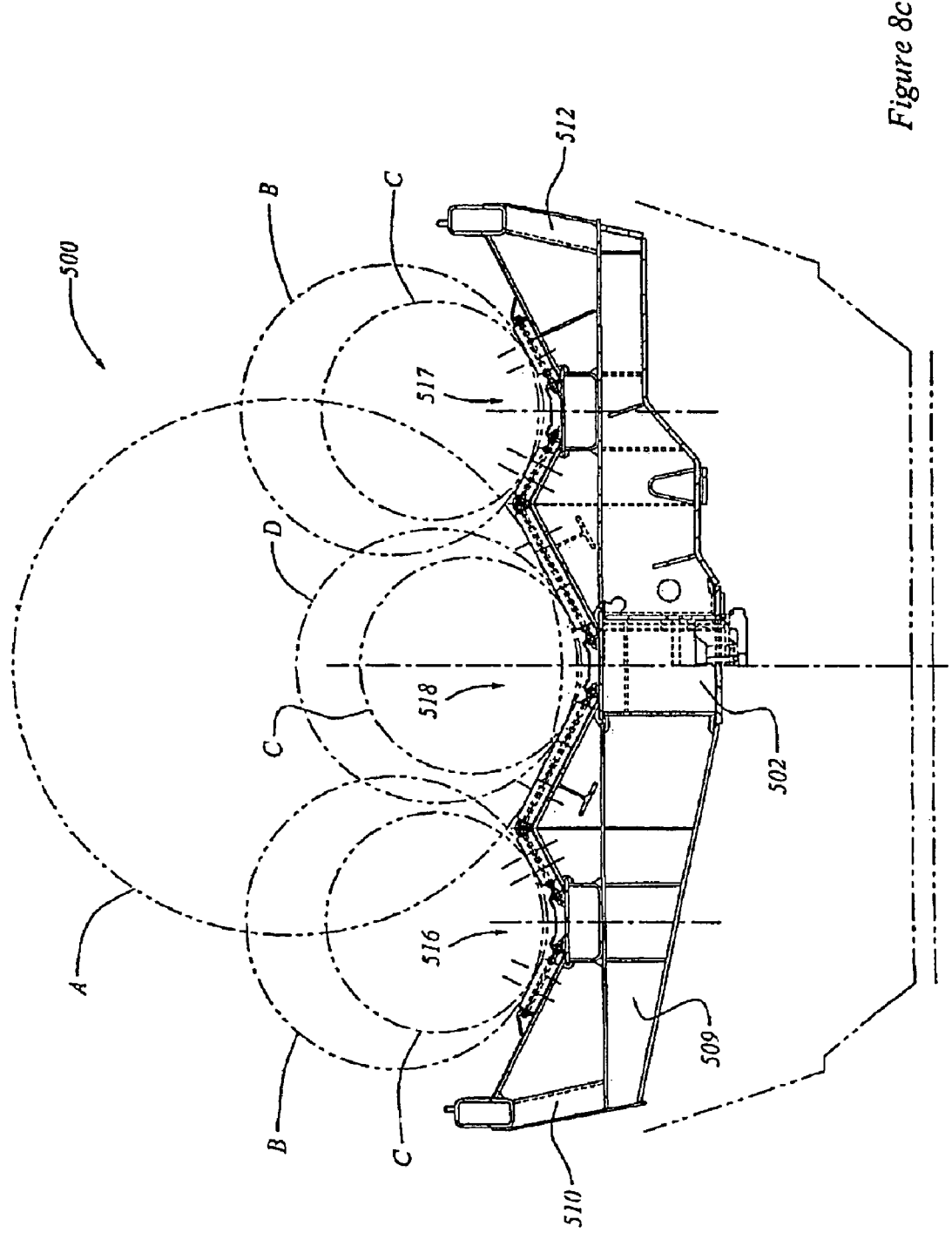

FIGS. 8a, 8b and 8c

In a further alternative embodiment, a coil car 500 can be constructed with a center sill having a variable depth of section. As above, coil car 500 is symmetrical about both it longitudinal centerline and a transverse axis at mid-span between trucks 26, 28, hence only a half illustration is provided to represent both ends. Referring to FIGS. 8a, 8b, and 8c, the structure of coil car 500 includes a center sill 502 extending longitudinally between rail car ends 504 and 506. Center sill 502 is the primary longitudinal structural element in coil car 500 for resisting vertical loads. Longitudinally extending side sills 510 and 512 are tied to centre sill 502 by an array of cross-bearers 509 that extend outwardly and away therefrom. The arrangement of center sill 502, cross-bearers 509 and side sills 510 and 512 support trough structure 514. Trough structure 514 has three parallel, longitudinally extending troughs 516, 497 and 518. Central trough 518 is arranged between outboard troughs 516 and 497 and is carried at a lower height relative to TOR than outboard troughs 516 and 497.

Examining center sill 502 in greater detail, it has a deep central portion 520 located intermediate two relatively shallow end portions 522 and 524. Central portion 520 has a constant depth of section. The transition from the relatively shallow section at end portions 522 and 524 to the deep section at central section 520, occurs as a step, as shown in FIG. 8a. A center sill of variable section, having shallow ends to clear the trucks, and deeper mid-span depth, whether constant or tapered, are often referred to as fish belly center sills, Alternatively, in another embodiment, central portion 520 can have a variable depth of section, the depth of section being greatest at a mid-span 70 distance between end portions 522 and 524. The maximum depth of section is provided at mid-span 70 to correspond to the location of the greatest bending moment. The transition from the relatively shallow section at end portions 522 and 524 to the deep section at central section 520, occurs in a substantially linear fashion, that is, the section tapers linearly moving away from the mid-span 70.

Center sill 502 is cambered such that, in an unloaded condition, the mid-span clearance above top of rail is greater than at the truck centers. The camber allows the center sill 502, in an unloaded condition, to have a clearance above top of rail (TOR) at mid-span 70 that is greater than the clearance above TOR at a location away from mid-span 70. In this way the depth of section of centre sill 502 at mid-span 70 can be maximized, while maintaining the minimum required clearance above (TOR) for the coil car when in a loaded condition.

Referring to FIG. 8b, fish belly center sill 502 includes an upper flange 530, a lower flange 532, and a pair of parallel vertical webs 534 and 536 that extend therebetween. Upper flange 530 of fish belly center sill 502 lies flush with the upper flange 526 of cross-bearers 509. Vertical webs 534 and 536 extend below lower flange 528 of cross-bearers 509 to join lower flange 532. At the location where lower flange 528 of cross-bearers 509 intersect with vertical webs 534 and 536, a gusset 538 is provided between vertical webs 534 and 536. A plate 540 is welded to lower flange 532 of fish belly center sill 502 to provide additional reinforcement.

In this embodiment, a different side sill configuration is used. As shown in FIG. 8b, each of side sills 510 and 512 includes a top flange assembly 546 and a web 548. No bottom flange assembly or bottom chord member is provided. The structure of side sills 510 and 512 does not extend below lower flange 532 of fish belly center sill 502. But rather terminates at the level of the lower flange of cross bearer 509. Top flange assembly 546 has a top chord member 550 in the nature of a hollow rectangular steel tube 552. Web 548 has a bent upper margin welded to the outer face of rectangular steel tube 552. Web 548 extends downwardly, and inwardly on an angle, and is attached to the ends of cross-bearers 509.

The trough structure of coil car 500 is the same as trough structure 38 of coil car 20, described above. A fish belly center sill coil car can also be manufactured having the main sill and cross bearer construction of coil car 500, and the trough structure of either coil car 200 or coil car 400, as shown in the Figures and described above, including internal walkways in the central or side troughs, or both. It will be understood that a center sill coil car, as shown in FIGS. 8a, 8b and 8c, can have coil stops such as coil stops 180 or 230, and coil stop retention means as described above.

A preferred embodiment has been described in detail and a number of alternatives have been considered. As changes in or additions to the above described embodiments may be made without departing from the nature, spirit or scope of the invention, the invention is not to be limited by or to those details, but only by the appended claims.

We claim:

1. A railroad coil car coil stop, for co-operation with a railroad coil car having a trough structure in which to carry coils, said coil stop comprising a beam member locatable athwart the trough structure, the beam member being movable along the trough structure, said beam member having a first end, a second end, and a flange for placement adjacent to a coil, said flange extending between said first and second ends; said beam member having a web connected to, and extending away from said flange, said coil stop having at least one motion facilitating member attached to said beam member, and said at least one motion facilitating member being oriented to facilitate motion in a direction normal to said flange, and said motion facilitating member is selected from the set of motion facilitating members consisting of (a) a roller; and (b) a polymeric sliding member.

2. The coil stop of claim 1 wherein one said at least one motion facilitating member is mounted at each of said first and second ends of said beam member.

3. The coil stop of claim 1 wherein said at least one motion facilitating member is said polymeric sliding member.

4. The coil stop of claim 1 wherein said coil stop has a motion facilitating member at each of said ends, these motion facilitating members including a pair of rollers mounted at each of said ends.

5. The coil car of claim 4 wherein said beam member has lugs mounted at said first end, lugs mounted at said second end; and said rollers are mounted on said lugs at said first and second ends.

6. The coil stop of claim 1 further comprising indexing members mounted at said first and second ends of said beam member, said indexing members being engageable to maintain said coil stop in a fixed position relative to the trough structure.

7. The coil stop of claim 1 further comprising attachment means mounted at said first and second ends of said beam member by which to secure the coil stop in a fixed position relative to the trough structure.

8. The coil stop of claim 1 wherein said coil stop has a step mounted on said beam member between said first and second ends.

9. The coil car of claim 8 wherein a hand grab is mounted to said beam member adjacent to said step.

10. A rail road coil car coil stop formed to seat athwart a coil car trough structure, said coil stop comprising a steel beam having a first end and a second end, said steel beam including a flange for placement facing a coil carried in the coil car, and a web extending away from said flange; said flange extending in a plane; said steel beam having a first set of rollers mounted at said first end, and a second set of rollers mounted at said second end; said first and second sets of rollers being engageable with trackways of the coil car trough structure; said coil stop being movable along the trough structure on said rollers in a direction normal to said plane of said flange.

11. The coil stop of claim 10 wherein said steel beam has a a second flange spaced from said first flange, and said web extends between said first and second flanges.

12. The coil stop of claim 11 wherein said web has lightening holes formed therein.

13. The coil stop of claim 11 wherein said web had a step defined thereon.

14. The coil stop of claim 11 wherein said coil stop has a handle extending upwardly therefrom.

15. The coil stop of claim 10 wherein said coil stop includes indexing members mounted at either end thereof.

* * * * *